(12) United States Patent
He et al.

(10) Patent No.: US 10,102,091 B2
(45) Date of Patent: *Oct. 16, 2018

(54) SYSTEM AND METHOD FOR SUPPORTING A TESTING FRAMEWORK FOR AN EVENT PROCESSING SYSTEM USING MULTIPLE INPUT EVENT STREAMS

(71) Applicant: Oracle International Corporation, Redwood Shores, CA (US)

(72) Inventors: Guan Nan He, Beijing (CN); Ying Xi, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 14/617,556

(22) Filed: Feb. 9, 2015

(65) Prior Publication Data
US 2015/0278057 A1 Oct. 1, 2015

Related U.S. Application Data

(60) Provisional application No. 61/971,283, filed on Mar. 27, 2014.

(51) Int. Cl.
*G06F 11/36* (2006.01)
*G06F 11/263* (2006.01)
*H04L 12/26* (2006.01)

(52) U.S. Cl.
CPC ........ *G06F 11/263* (2013.01); *G06F 11/2635* (2013.01); *G06F 11/3664* (2013.01);
(Continued)

(58) Field of Classification Search
CPC ....... H04L 43/00; H04L 43/067; H04L 43/08; H04L 43/0888; H04L 43/0894;
(Continued)

(56) References Cited

U.S. PATENT DOCUMENTS 5,579,476 A * 11/1996 Cheng ................. G06F 11/3688
714/32
5,991,751 A 11/1999 Rivette
(Continued)

OTHER PUBLICATIONS

Wikipedia's Multithreading (computer architecture) historical version published Jan. 20, 2014 https://en.wikipedia.org/w/index.php?title=Multithreading_(computer_architecture)&oldid=591586821.*
(Continued)

*Primary Examiner* — Joseph O Schell
(74) *Attorney, Agent, or Firm* — Tucker Ellis LLP

(57) ABSTRACT

Systems and methods can use a testing framework for testing an event processing system. The testing framework operates to send a plurality of input events in multiple event streams to an event processing system, wherein each said input event is associated with a timestamp. Also, the testing framework prescribes one or more expected output events that correspond to said plurality of input events in multiple event streams, wherein each said expected output event is associated with a timestamp. Furthermore, the testing framework can use said one or more expected output events to verify one or more actual output events that are received from the event processing system, wherein each said actual output event is associated with a timestamp.

27 Claims, 20 Drawing Sheets

(52) U.S. Cl.
CPC .......... *G06F 11/3684* (2013.01); *H04L 43/50* (2013.01); *G06F 11/3688* (2013.01); *H04L 43/14* (2013.01)

(58) Field of Classification Search
CPC ........ H04L 43/14; H04L 43/50; H04W 24/06; H04W 24/08; G06F 11/3664; G06F 11/3684; G06F 11/3688; G06F 11/263; G06F 11/2635
See application file for complete search history.

(56) References Cited

U.S. PATENT DOCUMENTS

| | | | |
|---|---|---|---|
| 6,134,690 A * | 10/2000 | Ivaturi | G06F 11/2294 714/46 |
| 6,138,121 A | 10/2000 | Costa | |
| 6,141,647 A | 10/2000 | Meijer | |
| 6,324,665 B1 | 11/2001 | Fay | |
| 6,408,324 B1 | 6/2002 | Wallace | |
| 6,502,133 B1 | 12/2002 | Baulier | |
| 6,785,677 B1 | 8/2004 | Fritchman | |
| 6,795,854 B1 | 9/2004 | Parker | |
| 6,907,426 B2 | 6/2005 | Hellerstein | |
| 7,162,540 B2 | 1/2007 | Jasen | |
| 7,356,764 B2 * | 4/2008 | Radja | G06F 17/2247 715/234 |
| 7,454,660 B1 | 11/2008 | Kolb | |
| 7,457,728 B2 | 11/2008 | Chen | |
| 7,478,365 B2 * | 1/2009 | West | G06F 11/3684 714/E11.208 |
| 7,627,544 B2 | 12/2009 | Chkodrov | |
| 7,661,032 B2 | 2/2010 | Eberbach | |
| 7,801,851 B2 | 9/2010 | Holenstein | |
| 8,904,353 B1 * | 12/2014 | Arguelles | G06F 11/3672 717/124 |
| 8,990,184 B2 | 3/2015 | Baum | |
| 9,098,587 B2 | 8/2015 | Deshmukh | |
| 9,244,978 B2 | 1/2016 | Alves | |
| 9,262,479 B2 | 2/2016 | Deshmukh | |
| 9,418,113 B2 | 8/2016 | Bishnoi | |
| 9,686,148 B2 | 6/2017 | Varney | |
| 9,697,262 B2 | 7/2017 | Chandramouli | |
| 9,753,825 B2 | 9/2017 | He | |
| 2005/0060372 A1 | 3/2005 | DeBettencourt | |
| 2005/0108001 A1 | 5/2005 | Aarskog | |
| 2005/0108718 A1 | 5/2005 | Kumar | |
| 2005/0222789 A1 * | 10/2005 | West | G11C 29/56 702/79 |
| 2005/0235356 A1 | 10/2005 | Wang | |
| 2006/0085163 A1 | 4/2006 | Nader | |
| 2006/0184410 A1 | 8/2006 | Ramamurthy | |
| 2006/0184961 A1 | 8/2006 | Lee | |
| 2006/0230029 A1 | 10/2006 | Yan | |
| 2006/0230071 A1 | 10/2006 | Kass | |
| 2006/0282695 A1 | 12/2006 | Mital | |
| 2007/0043703 A1 | 2/2007 | Bhattacharya | |
| 2007/0083630 A1 | 4/2007 | Roth | |
| 2007/0100994 A1 * | 5/2007 | Armstrong | G06F 11/28 709/224 |
| 2007/0250766 A1 | 10/2007 | Medi | |
| 2007/0266137 A1 * | 11/2007 | Malik | H04L 43/50 709/223 |
| 2007/0271280 A1 | 11/2007 | Chandasekaran | |
| 2008/0019283 A1 * | 1/2008 | Emile | H04L 41/142 370/252 |
| 2008/0120283 A1 | 5/2008 | Liu | |
| 2008/0189277 A1 | 8/2008 | Meijer | |
| 2008/0222463 A1 * | 9/2008 | Parthasarathy | H04W 24/06 714/712 |
| 2008/0307435 A1 | 12/2008 | Rehman | |
| 2008/0320462 A1 | 12/2008 | Bergman | |
| 2009/0070786 A1 | 3/2009 | Alves | |
| 2009/0199160 A1 | 8/2009 | Vaitheeswaran | |
| 2009/0271351 A1 | 10/2009 | Kandasamy | |
| 2010/0332641 A1 | 12/2010 | Shanmugasundaram | |
| 2011/0131451 A1 | 6/2011 | Bosch | |
| 2011/0178775 A1 * | 7/2011 | Schoning | G06F 11/28 702/190 |
| 2011/0208469 A1 | 8/2011 | Sheye | |
| 2011/0225565 A1 | 9/2011 | Van Velzen | |
| 2011/0295833 A1 | 12/2011 | Narasayya | |
| 2013/0007584 A1 | 1/2013 | Gould | |
| 2013/0346441 A1 | 12/2013 | Imaki | |
| 2014/0172512 A1 | 6/2014 | Chandra | |
| 2014/0189646 A1 | 7/2014 | Suryadevara | |
| 2014/0258787 A1 | 9/2014 | Edrich | |
| 2015/0003570 A1 | 1/2015 | Patel | |
| 2015/0113331 A1 * | 4/2015 | Bhattacharya | G06F 11/3688 714/38.1 |
| 2015/0254330 A1 | 9/2015 | Chan | |
| 2015/0278057 A1 | 10/2015 | He | |
| 2015/0278060 A1 | 10/2015 | He | |
| 2016/0080835 A1 | 3/2016 | Von Sneidern | |
| 2016/0124900 A1 | 5/2016 | Balakrishnan | |
| 2016/0212023 A1 | 7/2016 | Mohan | |

OTHER PUBLICATIONS

United States Patent and Trademark Office, Office Action dated Nov. 16, 2017 for U.S. Appl. No. 14/617,533, 21 pages.

* cited by examiner

SYSTEM AND METHOD FOR SUPPORTING A TESTING FRAMEWORK FOR AN EVENT PROCESSING SYSTEM USING MULTIPLE INPUT EVENT STREAMS

CLAIM OF PRIORITY

This application claims priority on U.S. Provisional Patent Application No. 61/971,283, filed Mar. 27, 2014 entitled "XML-BASED TESTING FRAMEWORK FOR EVENT PROCESSING LANGUAGE" which application is herein incorporated by reference in its entirety.

CROSS REFERENCE TO RELATED APPLICATIONS

This application is related to the following patent applications, each of which is hereby incorporated by reference in its entirety:

U.S. patent application Ser. No. 12/133,220, filed Jun. 4, 2008 entitled "XML-BASED EVENT PROCESSING NETWORKS FOR EVENT SERVER".

U.S. patent application Ser. No. 14/617,526, filed Feb. 9, 2015, entitled "SYSTEM AND METHOD FOR USING AN EVENT WINDOW FOR TESTING AN EVENT PROCESSING SYSTEM";

U.S. patent application Ser. No. 14/617,528 filed Feb. 9, 2015, entitled "SYSTEM AND METHOD FOR SUPPORTING A SLIDING WINDOW FOR TESTING AN EVENT PROCESSING SYSTEM"; and U.S. patent application Ser. No. 14/617,533, filed Feb. 9, 2015, entitled "SYSTEM AND METHOD FOR CONFIGURING A SLIDING WINDOW FOR TESTING AN EVENT PROCESSING SYSTEM BASED ON A SYSTEM TIME".

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to information technology, and particularly related to testing an event processing system.

BACKGROUND

In modern society, the ability to process a large amount of data in real time becomes a crucial competitive fact for a company. For example, a large number of sensors and smart devices, which are connected to a fast network, can be used concurrently. An event processing system can be used for processing the data generated from these sources, which are inherently streaming data sources. It is desirable to automate the test cases for the event processing system. These are the generally areas that embodiments of the invention are intended to address.

SUMMARY

Described herein are systems and methods that can use a testing framework for testing an event processing system. The testing framework operates to send a plurality of input events in multiple event streams to an event processing system, wherein each said input event is associated with a timestamp. Also, the testing framework prescribes one or more expected output events that correspond to said plurality of input events in multiple event streams, wherein each said expected output event is associated with a timestamp. Furthermore, the testing framework can use said one or more expected output events to verify one or more actual output events that are received from the event processing system, wherein each said actual output event is associated with a timestamp.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the continuous query language (CQL) as an example for an event processing language. It will be apparent to those skilled in the art that other types of event processing languages can be used without limitation.

Described herein are systems and methods that can support a testing framework for an event processing system.

A Testing Framework for Event Stream Processing

In an event processing system (a.k.a. an event stream processing system), an event indicates a change in the real world that can be represented or generated digitally using a computing system. Furthermore, an event stream is a sequence of events that are generated continuously. For example, the order of the events in the event stream may be the order that the events are generated or appended.

The event processing system, such as the Oracle Complex Event Processing (CEP) system, can take advantage of a real-time event driven architecture that is capable of processing a large number of continuous data with low latency, e.g. using filtering, aggregation, correlation, pattern match, trend detection and other techniques, before publishing the output events.

The event processing system can be based on different event processing languages, which can be more complex than other data processing languages. Also, the different event processing languages may share common concepts, functionalities and structures (such as WHERE, GROUP BY, HAVING, ORDER BY, JOIN, and collection operations). For example, an event processing language (e.g. the CQL) can be derived from the structured query language (SQL). Also, the event processing language can incorporate various event stream processing specific concepts, such as the event window, pattern match, stream-relation conversion operators, into the SQL.

In accordance with an embodiment of the invention, an event processing system can read and process the input data, and outputs the result based on various rules. The rules can be stored in plain text file, which is easy for humans to read and edit. Also, modifications can be made over the network and can take effect immediately.

Furthermore, the event processing system can extend the rule language to meet various domain specific requirements. Thus, the users can focus on the business logic rather than the complex technical procedures.

Figure 1:
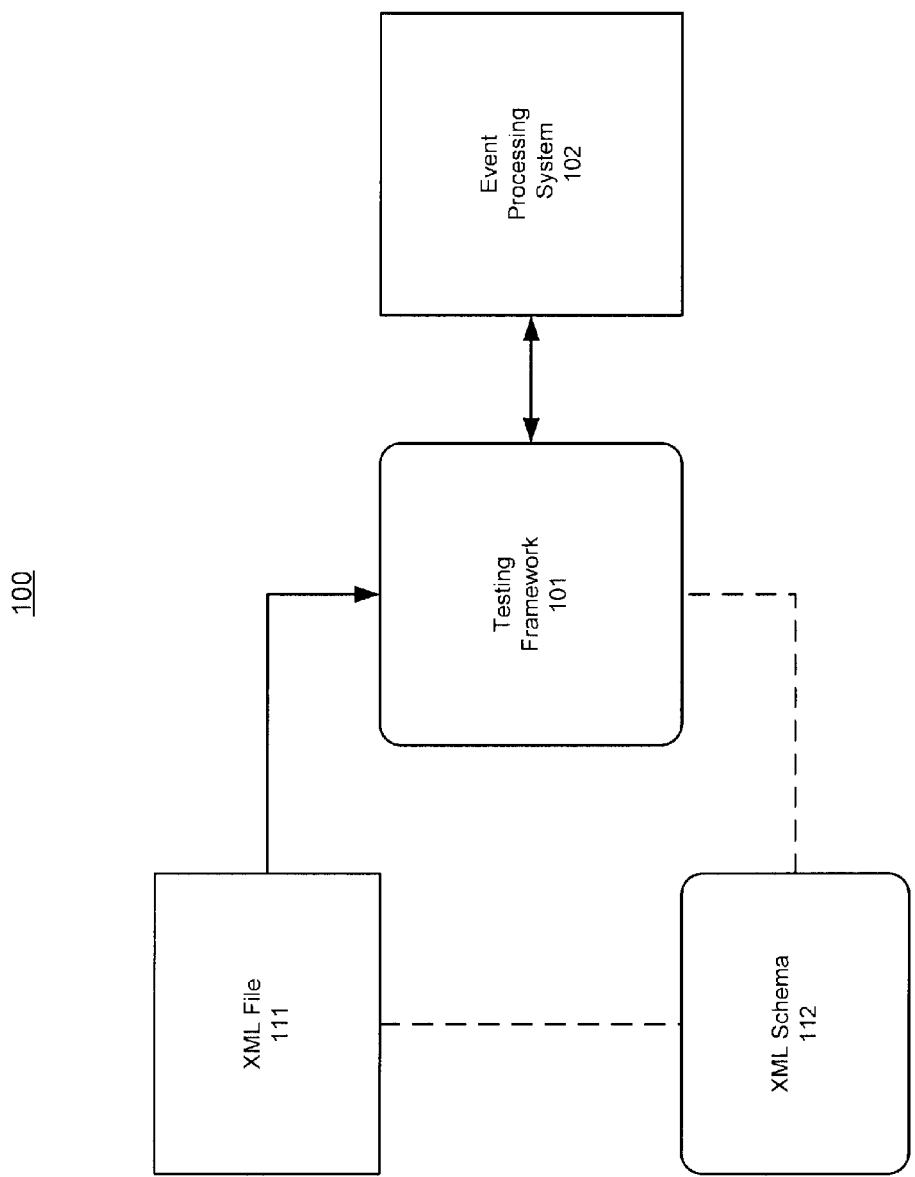
FIG. 1 shows an illustration of a framework for testing an event processing system, in accordance with an embodiment of the invention.

FIG. 1 shows an illustration of a framework for testing an event processing system, in accordance with an embodiment of the invention. As shown in FIG. 1, a testing environment 100 can support a testing framework 101, which is capable of testing an event processing system 102.

In accordance with an embodiment of the invention, the testing framework 101 supports a declarative approach for automating various tests. For example, the different testing steps can be automated using various declarative scripts, such as the Ant scripts, which can be imported into the testing framework 101.

As shown in FIG. 1, the testing framework 101 can be based on an XML schema 112, which is designed for testing an event processing language that is used in the event processing system 102. The event processing language can have complex structures, different operators and functions. For example, a query in the event processing language may have a large number of forms. Also, a query may require different input data to cover different scenarios or paths.

Furthermore, the XML schema 112 can declare the data structures, rules, input data, expected output data, and different verification logics for testing the event processing system 102.

The testing framework 101 can use an XML file 111 for specifying the input data, the processing queries, and the expected output in the format as declared in the XML schema 112. Also, the testing framework 101 allows the users to organize the tests in a tree structure and can share the input data and event types across different test cases.

In accordance with an embodiment of the invention, the testing framework 101 can parse the XML test file 111 and locate the tests (e.g. per the request from a client). For example, before executing the tests in the test XML file 111, the testing framework 101 can convert the tests into an event processing network (EPN) that the concrete event stream processing system 102 supports.

Also, the testing framework 101 can conveniently verify the results of the event stream processing system 102. For example, the testers (or the developers and the users of the event stream processing system 102) can add or modify one or more tests by editing the XML file 111, in which case the testing framework 101 is able to execute the tests without compilation.

Thus, the testing framework 101 allows the test developers to easily handle the input data, queries, and expected output in the tests.

Figure 2:
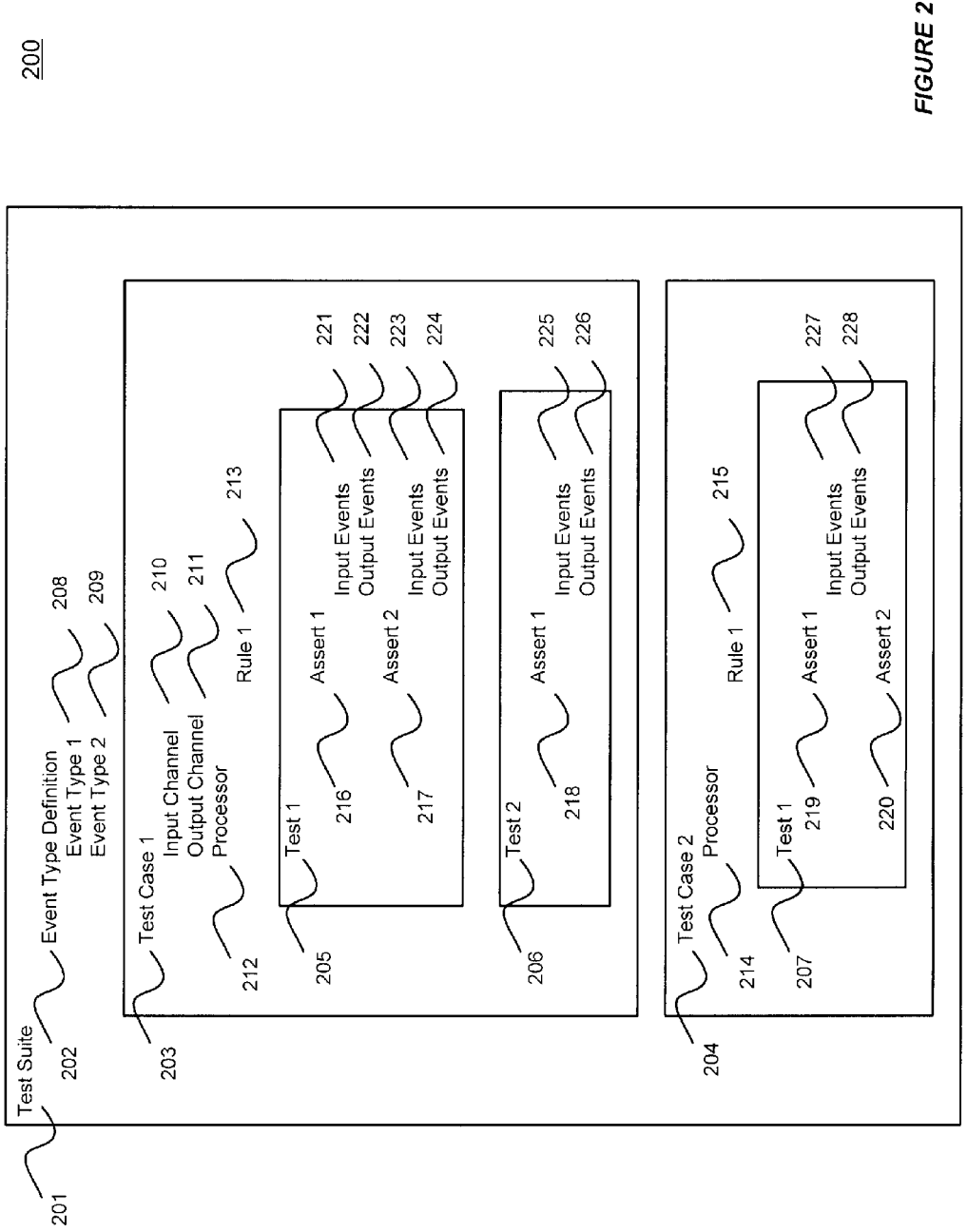
FIG. 2 shows an illustration of an XML test file for an event processing system, in accordance with an embodiment of the invention.

FIG. 2 shows an illustration of an XML test file for an event processing system, in accordance with an embodiment of the invention. As shown in FIG. 2, a testing framework can organize various tests in an XML test file 200 based on a tree structure.

The top level (e.g., a root element) of the XML test file is a test-suite element 201 that defines a test suite (e.g. a <test-suite/> element in XML), which may represent a set of tests for testing a particular feature of an event processing language that is used in an event processing system.

As shown in FIG. 2, the test-suite element 201 can comprise one or more event type definitions 202 (such as the event types 1-2 208-209) and various test cases 203-204. Each event type represents a data structure that may comprise a number of properties, such as the name, time, location, measures, and associations with other events, which provides various context information for an event.

The following is an exemplary schema definition for a <test-suite/> element in XML.

```
<xsd:element name="test-suite" type="TestSuiteType" />
<xsd:complexType name="TestSuiteType">
    <xsd:sequence>
        <xsd:element name="event-type-repository"
minOccurs="1" maxOccurs="1" type="EventTypeRepositoryType"/>
        <xsd:element name="test-case" minOccurs="1"
maxOccurs="unbounded" type="TestCaseType" />
    </xsd:sequence>
    <xsd:attribute name="name" type="xsd:string" use="required" />
</xsd:complexType>
```

As shown in the above, the <test-suite/> element in XML comprises one <event-type repository/> element, which defines various event types, and one or multiple <test-case/> elements, which define one or more test cases.

In accordance with an embodiment of the invention, the testing framework 200 can support different kinds of event types, such as a class based event type and a map based event type, for event stream processing.

The class based event type can be a binary stereotyped object, which is bound to a specific programming language and can be reused in different test suites. For example in Java, the class based event type can be a Java bean class.

The following is an exemplary schema definition for a class based event type.

```
<xsd:complexType name="EventTypeType">
<xsd:sequence minOccurs="0">
    <xsd:choice minOccurs="0">
        <xsd:element name="properties" type="PropertyType"/>
        <xsd:element name="class" type="xsd:string"/>
    </xsd:choice>
</xsd:sequence>
<xsd:attribute name="type-name" type="xsd:string" use="required"/>
</xsd:complexType>
```

The map based event type can be declared in the XML test file by specifying the properties and data types of an event. The map based event type supports a key-value structure that provides flexibility for the event stream processing system to maintain additional information that can be useful for the system to process the events internally (such as in the rules). For example, the additional information may include pseudo columns such as the timestamp of an event and the kind of an event (e.g. insert/delete/update).

The following is an exemplary schema definition for a map based event type.

```
<xsd:complexType name="PropertyType">
    <xsd:sequence>
        <xsd:element name="property" maxOccurs="unbounded">
            <xsd:complexType>
<xsd:attribute name="name" type="xsd:string" use="required"/>
        <xsd:attribute name="type" type="xsd:string" use="required"/>
<xsd:attribute name="length" type="xsd:int" use="optional"/>
            </xsd:complexType>
        </xsd:element>
    </xsd:sequence>
</xsd:complexType>
```

In accordance with an embodiment of the invention, each of the test case elements 203-204 can define the data model and the processing logic (e.g. representing a set of tests for a particular rule). As shown in FIG. 2, a test case element 203 (e.g. a <test-case/> element in XML) defines the input streams in the input channel element 210, defines the output stream in the output channel element 211, and the rules 213 in the processor element 212. Also, a test case element 204 defines the rules 215 in the processor element 214.

The following is an exemplary schema definition of a <test-case/> element in XML.

```
<xsd:complexType name="TestCaseType">
    <xsd:sequence>
<xsd:element name="input-channel" minOccurs="1"
maxOccurs="unbounded" type="EventChannelType"></xsd:element>
<xsd:element name="output-channel" minOccurs="0" maxOccurs="1"
type="EventChannelType"></xsd:element>
<xsd:element name="processor" type="ProcessorType" minOccurs="1"
maxOccurs="1"/>
<xsd:element name="test" minOccurs="1" maxOccurs="unbounded"
type="TestType" />
    </xsd:sequence>
    <xsd:attribute name="name" type="xsd:string" use="required" />
</xsd:complexType>
```

As shown in the above, the <test-case/> element in XML comprises one or multiple <input-channel/> element, zero or one <output-channel/> element, one <processor/> element, and one or multiple <test/> elements.

In accordance with an embodiment of the invention, an event channel is a component used in the event stream processing system for delivering events between various components. The event channel can be bound with an event type. Either an event type name or an event channel name can be used in a rule for referencing the stream of specific events. Thus, the events can be passed from an event channel to a processor and from a processor to an event channel.

For example, as shown in the above, both the <input-channel/> element and the <output-channel/> element can be bound with an event type (and are associated with the same EventChannelType). Additionally, the <processor/> element may only allow one executive rule, whereas the other rules that are used or referenced in the executive rule can serve as sub-queries.

In accordance with an embodiment of the invention, each of the test elements 205-207 can represent a concrete test and provides the input and expected output for the test. For example, the test elements 205-207 can take advantage of a data driven model, which reflects the nature of the streaming event system.

As shown in FIG. 2, each test case in the test suite 201 can contain a number of tests, while each test can have one or more asserts. For example, the test case 203 can contain a number of tests 205-206, the test 205 may include asserts 216-217 and the test 206 may include the assert 218. Furthermore, the test case 204 can contain a test 207, and the test 207 may include asserts 219-220.

The following is an exemplary schema definition of a <test/> element in XML.

```
<xsd:complexType name="TestType">
    <xsd:sequence>
        <xsd:element name="assert" minOccurs="1"
maxOccurs="unbounded">
        <xsd:complexType >
            <xsd:choice minOccurs="0" maxOccurs="unbounded">
                <xsd:element name="input-events"
type="InputEventsType"/>
                <xsd:element name="output-events"
type="OutputEventsType"/>
            </xsd:choice>
            <xsd:attribute name="id" type="xsd:string" use="optional" />
        </xsd:complexType>
        </xsd:element>
    </xsd:sequence>
    <xsd:attribute name="name" type="xsd:string" use="required" />
</xsd:complexType>
```

As shown in the above, the <test/> element in XML can comprise one or multiple <assert/> elements, and each <assert/> element comprises one or multiple <input-events> elements and zero or one <output-events/> element.

In accordance with an embodiment of the invention, each of the assert elements 216-220 can have one or more input-events and output-events. For example, in order to simplify the testing of the event processing system using an event processing language, the testing framework 200 may require that each assert in a test can have one or multiple input-events and only one output-event.

Furthermore, the flexible structure of an assert element allows a user to author tests taking advantage of different input and verification strategies.

In accordance with an embodiment of the invention, the events 221-228 in the testing framework can be modeled as input-events and output-events respectively. The input-events and the output-events can be bound with an event channel (i.e. with an event type). For example, if the events are provided directly in the XML test file, the event type name can be used as the element name and the properties can be specified as the attributes of the element. If the events are provided in an external comma separated values (CSV) file, the property names of the event type can be stated at the header.

In accordance with an embodiment of the invention, the framework supports data sharing among tests. For example, the different event types 208-209 can be shared among different test cases 203-204 in the test suite 201. Different tests 205-206 in one test case 203 can share the same processing rules 213. Additionally, different tests 205-207 can share the same input data/output data by using external files, e.g. CSV files. Thus, the users can design the tests 205-207 based on a uniformed data model.

The following List 1 is an exemplary XML file that is based on the above schema definitions.

List 1

```
<event-type-repository>
        <event-type type-name="StockEvent">
        <class>cep.tests.events.StockEvent</class>
        </event-type>
<event-type type-name="TradeEvent">
        <properties>
<property name="product" type="string" length="80"/>
        <property name="price" type="float"/>
        <property name="amount" type="int"/>
        <property name="tradeTime" type="timestamp"/>
        </properties>
</event-type>
</event-type-repository>
<input-channel id="s1" event-type="StockEvent" />
<input-channel id="s2" event-type="StockEvent" />
<output-channel id="s3" event-type="TradeEvent"/>
<processor>
    <rule id="q1" type="query">
SELECT "STOCK" as product, s1.price as price, s2.createTime as tradeTime FROM channel1 as s1, channel2 as s2 WHERE s1.symbol=s2.symbol AND s1.price < s2.price
</rule>
</processor>
<assert>
<input-events channel="channel1">
        <StockEvent symbol="ABC" price="19.8"
            createTime ="10080900">
<StockEvent symbol="AAA" price="29.9" createTime ="10080901">
</input-events>
```

List 1

```
<input-events channel="channel2" file="input/stock.csv">
<input-events>
<output-events channel="s3" verify="all">
        <TradeEvent product="STOCK" price="19.8"
            tradeTime="10080901"/>
output-events>
</assert>
```

As shown in the above, the XML file defines an event type of StockEvent and an event type of TradeEvent in the event type repository. Additionally, the input channels s1 and s2 are associated with the StockEvent, and the output channel s3 is associated with the TradeEvent. In the rule section, the event channel name s1 and s2 are used to specify from which stream the input events may come.

As the test is executed, the testing framework reads in the input events data, converts the input events data into the associated StockEvent event type, and sends the events to the input channels s1 and s2. Then, the rule engine in the event processing system can process the input events based on the logic specified in the rule section, generates a new schema for the output events using the TradeEvent event type, and sends the output events to the output channel s3, where an event listener is registered by the framework to hold and send output events.

Once the input events are sent, the testing framework can read in the output events data from the XML file, converts the output events data into the associated event type, TradeEvent, and compares these expected output events with the actual output events that are received from the event channel s3, as indicated by the "channel" attribute in the <output-events/> element.

Figure 3:
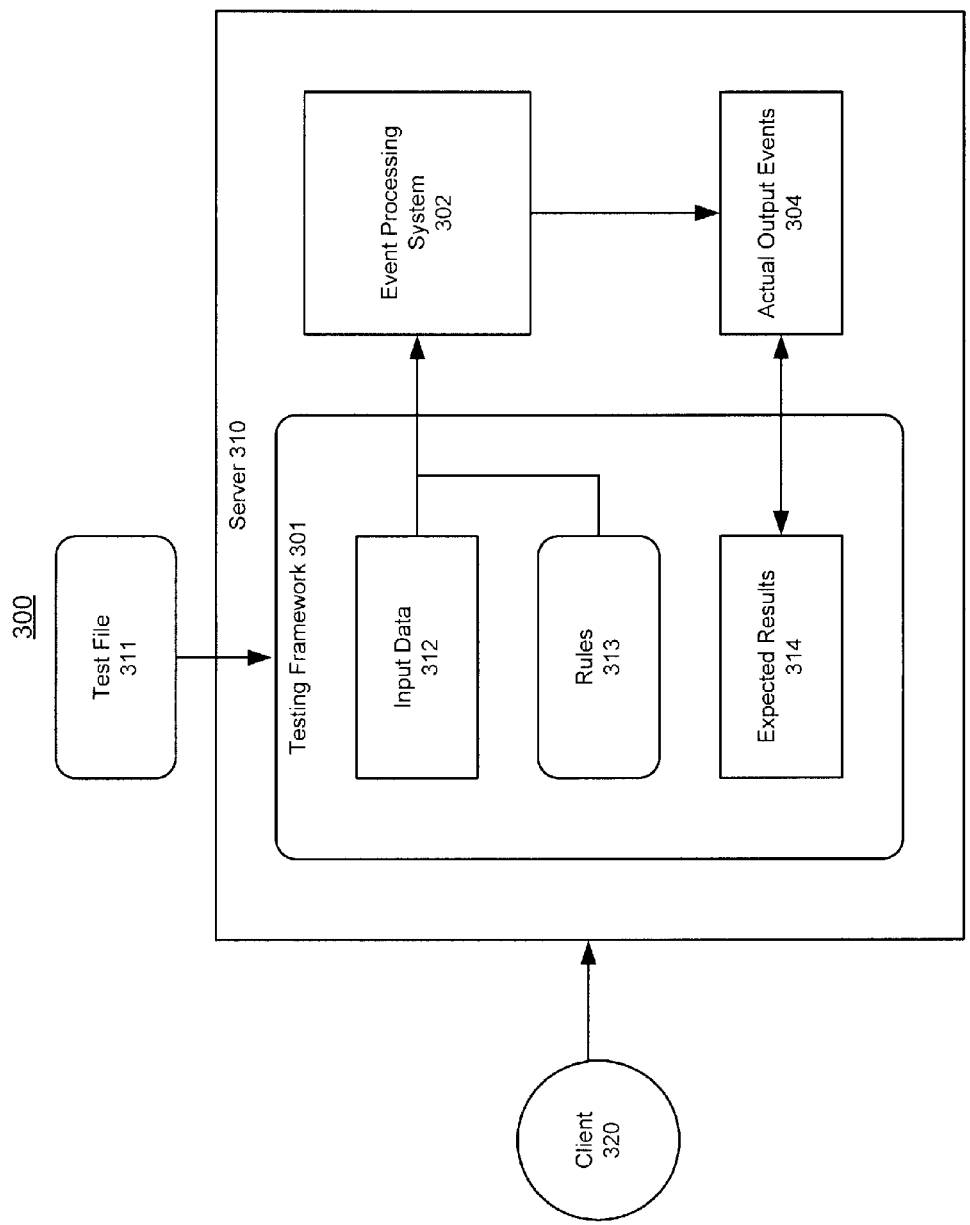
FIG. 3 shows an illustration of a testing framework based on a client/server architecture, in accordance with an embodiment of the invention.

FIG. 3 shows an illustration of a testing framework based on a client/server architecture, in accordance with an embodiment of the invention. As shown in FIG. 3, a testing environment 300 can support a testing framework 301 for testing an event processing system 302.

A test client 320 can deploy the testing framework 301 on the server 310, which runs on (or is connected to) the event stream processing system 302. In accordance with an embodiment of the invention, the testing framework 301 can be compiled and built before the event stream processing system 302 is started. Also, the event stream processing system 302 (or a rule engine) can be started prior to the running of the tests.

In accordance with an embodiment of the invention, the test client 320 can pass various parameters to the server 310 to inform the testing framework 301 where to find the tests to be executed. In addition, the testing framework 301 is able to load the library that defines various data structures used by the testing framework 301. Also, the testing framework 301 is able to know the path to find the external files that store the input data and expected results 314 (or data).

Furthermore, the testing framework 301 can register the data structures and the rules 313 defined in the test file 311. Also, the testing framework 301 can create the components that are used for handling input and output and create the component for handling the rules. Additionally, the testing framework 301 can register the customized component to receive the result from the output component.

As shown in FIG. 3, when the test client 320 invokes a test for testing the event stream processing system 302, the testing framework 301 can read the input data 312, provides the rules 313 to the event stream processing system 302, collects the actual output events 304 (i.e. the actual result), and compares the actual output events 304 with the expected results 314 (or throwing exception with the failure details to indicate a failing test).

Furthermore, when the testing framework 301 receives the actual output events 304, the testing framework 301 can construct an internal representation for each actual output event 304. The internal representation for the actual output events 304 may have the same (or similar) structure as an expected output event. Also, different pseudo column names can be used for the different event processing languages.

The following shows a structure of an exemplary internal representation.

```
class MyEvent {
    timestamp: long
    kind:String
    event:Object
}
```

As shown in the above, timestamp and kind are pseudo properties, which may not be part of the event type schema as defined in the <event-type-repository/> element. Also, both the class based events and the map based events can have the same pseudo properties, such as timestamp and kind, which can be used for both input and verification.

For example, the testing framework 301 can set the pseudo property timestamp according to the value of the pseudo column "timestamp" of the actual event and can set the property kind according to the pseudo column "kind" of the actual event, while setting the property event directly according to the actual event.

Finally, after the tests are executed, the testing framework 301 can generate a report to present the status of the execution (or provide the details of the failures).

In accordance with an embodiment of the invention, the testing framework 301 is capable of supporting different strategies for input and verification, providing event window with transparent timestamps, supporting input from multiple streams, verifying the result of sliding window based on an application timestamp, and verifying the result of sliding window based on a system timestamp.

Different Strategies for Input and Verification

Figure 4:
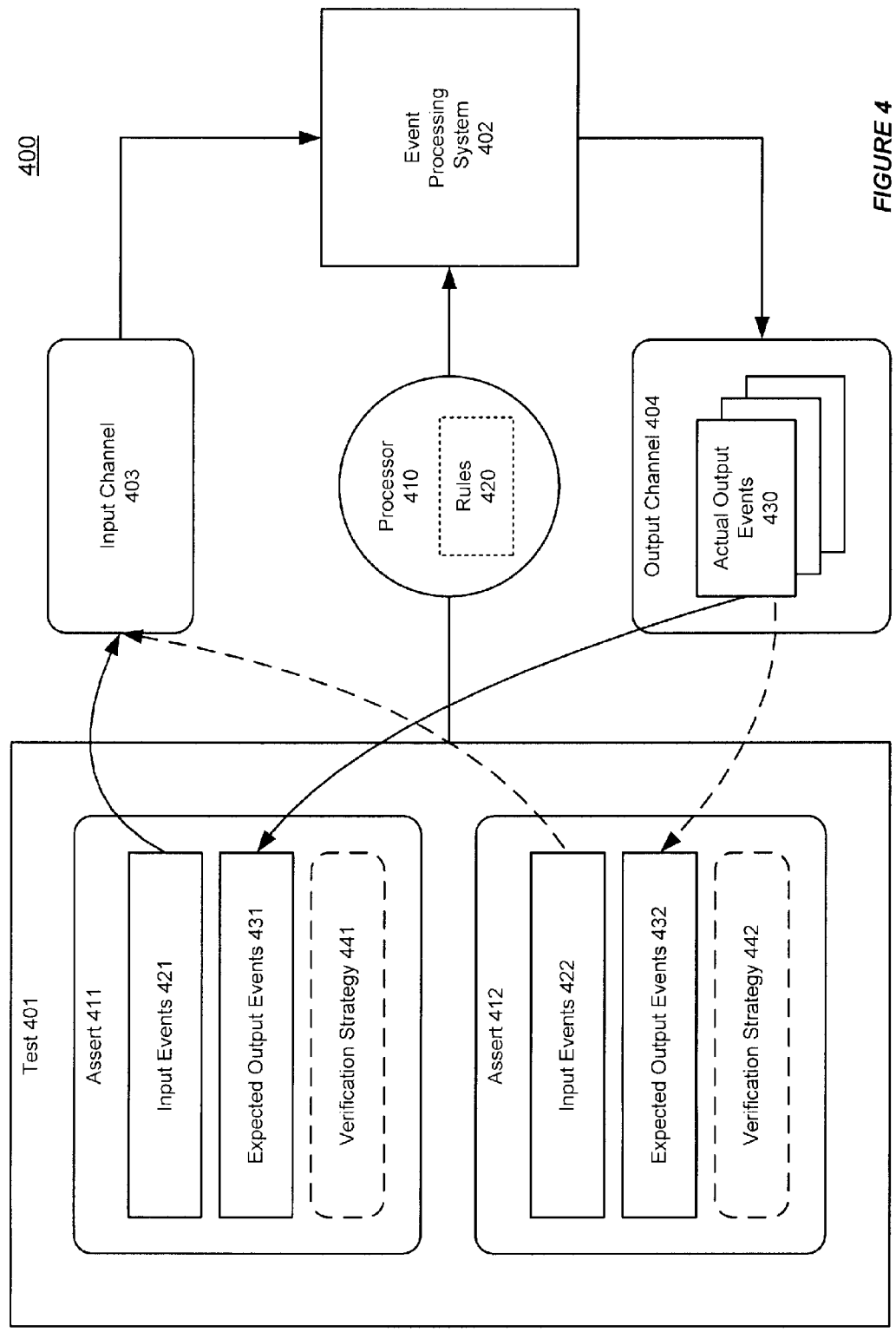
FIG. 4 shows an illustration of testing an event processing system using different strategies for input and verification, in accordance with an embodiment of the invention.

FIG. 4 shows an illustration of testing an event processing system using different strategies for input and verification, in accordance with an embodiment of the invention. As shown in FIG. 4, a test 401 in a testing framework 400 can include one or more asserts 411-412. The assert 411 can define one or more input events 421 and one or more expected output events 431, while the assert 411 can define one or more input events 422 and one or more expected output events 432.

The testing framework 400 can send the various input events to an event processing system 402 using one or more pre-configured input channels 403. Additionally, the testing framework 400 can use a processor 410 to define one or more executable rules 420 for the event processing system 402. For example, the testing framework 400 can define only one executable rule in each test in order to simplify the testing task. Also, an executable rule can reference to other rules that may serve as sub-queries.

Then, the testing framework 400 can receive one or more actual output events 430 from an output channel 404 configured for the event processing system 402, after the event processing system 402 has processed the incoming events based on the rule processing.

In accordance with an embodiment of the invention, the testing framework 400 can use different verification strategies for verifying different asserts. As shown in FIG. 4, the testing framework 400 can use different verification strategies 441-442 for matching the received actual output events 430 with the expected output events 431-432.

For example, the testing framework 400 allows a user to use the following verification strategies:
Input-output verification
Stepped input-output verification
Event-by-event verification
Prepared data in event window
Multiple streams input The input-output verification strategy, which is a basic strategy, allows the <test/> element to only have one <assert/> element, and allows the <assert/> element to only have one <input-events> element and one <output-events> element. The following is an exemplary <test/> element using the input-output verification strategy.

```
<test id="testFunctionMax">
    <assert>
        <input-events channel="s1">
            <MyEvent .../> <MyEvent .../>
        </input-events>
        <output-events channel="s2">
            <Event .../> <Event .../>
        </output-events>
    </assert>
</test>
```

The stepped input-output verification strategy is an extension to the input-output verification strategy. Using the stepped input-output verification strategy, an <assert/> element can include multiple <input-events/> and <output-events/> pairs. The timestamp of the events in an <input-events/> are successive to the timestamp of the events in the previous <input-events/>. Thus, the user is able to test a particular rule with different inputs from different aspects.

The following is an exemplary <test/> element using the stepped input-output verification strategy.

```
<test id=" testFunctionMax">
    <assert>
        <input-events channel="s1"></input-events>
        <output-events channel="s2"></output-events>
    <input-events channel="s1"></input-events>
        <output-events channel="s2"></output-events>
    </assert>
</test>
```

The event-by-event verification strategy can be beneficial for supporting continuous verification. The <assert/> element can have multiple <input-events> and <output-events> pairs, while there is only one event to input in each <input-events/> element. Thus, the user can ensure that the insert/delete events are generated properly in the process.

There can also be a strategy for preparing data in an event window. The strategy allows the first <assert/> element, in a set of multiple <assert/> elements, to be only used for preparing the data in the event window without verifying the output. As a result, the test is able to start with non-empty event window, when there are a large number of events involved.

The following is an exemplary <test/> element using the strategy of prepared data in an event window.

```
<test id="testFunctionMax">
    <assert>
        <input-events channel="s1"></input-events>
    </assert>
    <assert>
<input-events channel="s1"></input-events>
        <output-events channel="s2"></output-events>
    </assert>
</test>
```

Also, a strategy can be used when the rule deals with multiple streams. For example, the streaming events may be inputted in parallel since the different streams may send input data simultaneously. The framework can insert the events asynchronously by using a "parallel" attribute on the <input-events/> element, while guaranteeing that the events are sent at the specified time.

The following is an exemplary <test/> element using the strategy for multiple streams input.

```
<test id="testUnionOperator">
    <assert>
        <input-events channel="s1"
            parallel="true"></input-events>
<input-events channel="s2" parallel="true"></input-events>
<output-events channel="s3"></output-events>
    </assert>
    <assert>
<input-events channel="s2"></input-events>
        <output-events channel="s3"></output-events>
    </assert>
</test>
```

Figure 5:
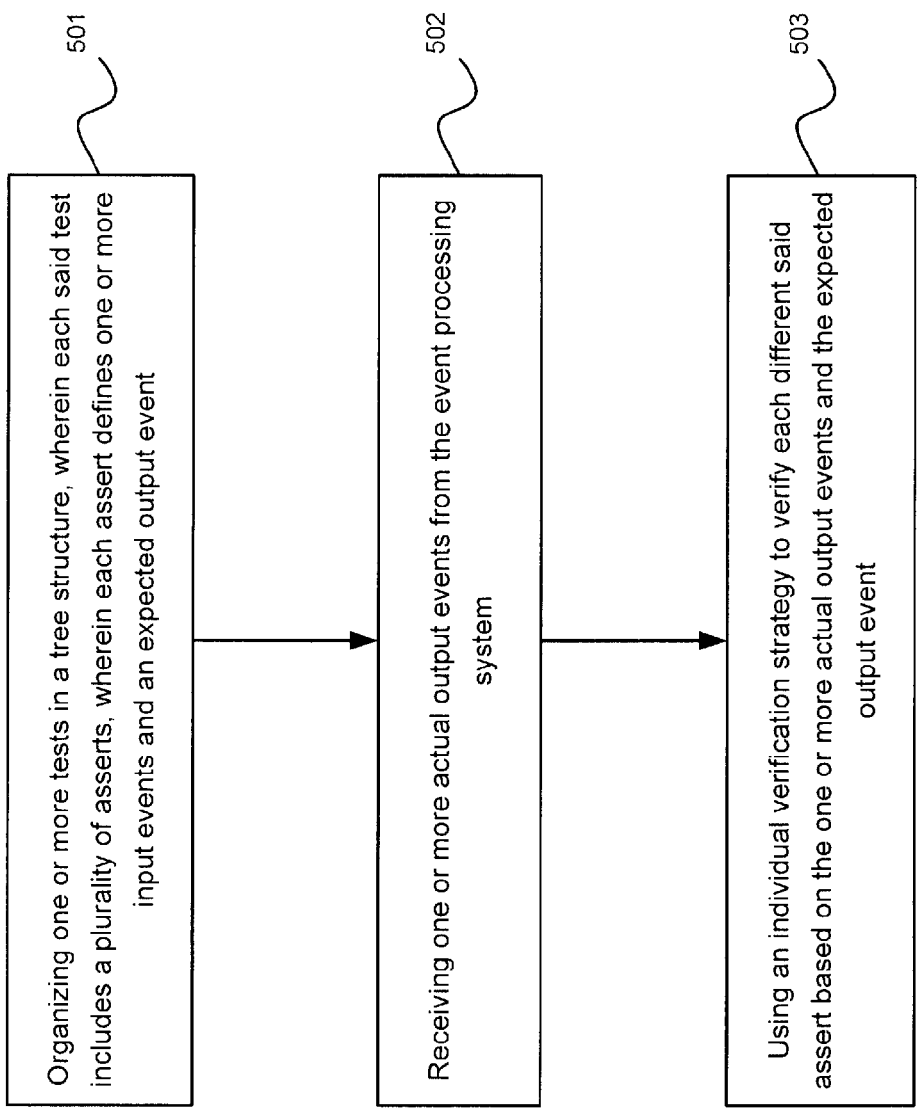
FIG. 5 illustrates an exemplary flow chart for testing an event processing system using different strategies for input and verification, in accordance with an embodiment of the invention.

FIG. 5 illustrates an exemplary flow chart for testing an event processing system using different strategies for input and verification, in accordance with an embodiment of the invention. As shown in FIG. 5, at step 501, a testing framework can organize one or more tests in a tree structure, wherein each said test includes a plurality of asserts, wherein each assert defines one or more input events and an expected output event. At step 502, the testing framework can receive one or more actual output events from the event processing system. Furthermore, at step 503, the testing framework can use an individual verification strategy to verify each different said assert based on the one or more actual output events and the expected output event Event Window and Timestamp In accordance with an embodiment of the invention, each event can be associated with a time (e.g. using a timestamp). Furthermore, the event stream processing system can use an event window, which moves forward along with the time, to indicate a range of events (e.g. up to the latest events) for processing.

Figure 6:
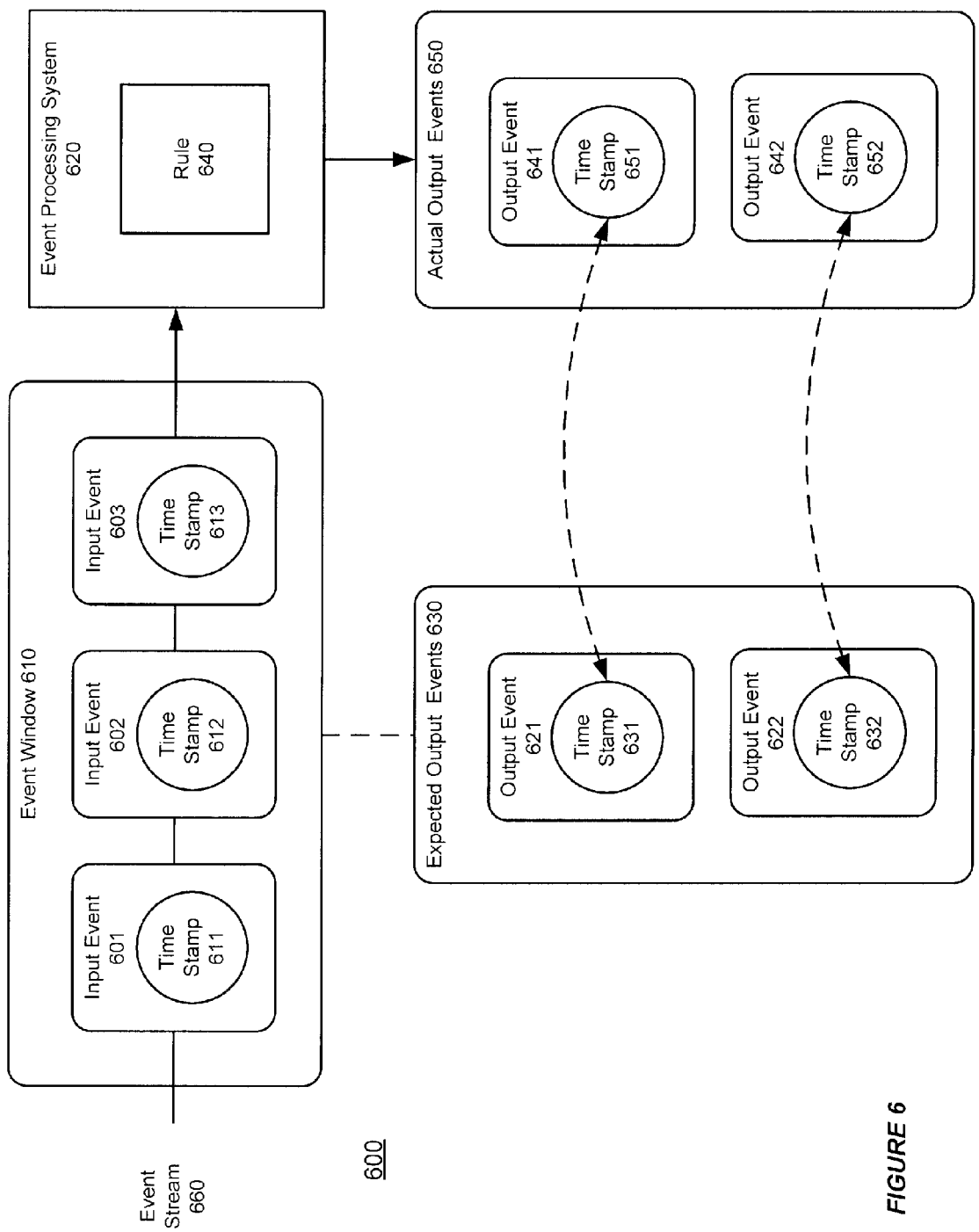
FIG. 6 shows an illustration of using an event window for testing an event processing system, in accordance with an embodiment of the invention.

FIG. 6 shows an illustration of using an event window for testing an event processing system, in accordance with an embodiment of the invention. As shown in FIG. 6, a testing framework 600 can provide an event stream 660 to an event processing system 620, which can process the events in the event stream 660 (using either a per-event mode or a batch mode).

The testing framework 600 can apply an event window 610 on the event stream 660. The event window 610 can include one or more input events 601-603, which are received and processed by the event processing system 620. Furthermore, each said input event 601-603 can be associated with a timestamp 611-613, the value of which may be configured in a test XML file.

In accordance with an embodiment of the invention, a timestamp can be based on either a system time or an application time. For example, a stream of events can be based on an application time (or be referred to as being application timestamped), if the event has an attribute holding the time information, the value of which can be used in the event processing.

On the other hand, a stream of these events can be based on a system time (or be referred to as being system timestamped), if there is no time attribute in the event data structure, or such attributes are not used in event processing. In such a case, the testing system may attach a system time to the event when the event is sent to the event processing system 620.

Furthermore, the testing framework 600 allows the users to design the tests transparently using both the system timestamp and the application timestamp, which are logically equivalent. Also, the model of the timestamp is transparent to the rules 640 used by the event processing system 620 (and/or the rule engine in the testing framework 600).

In accordance with an embodiment of the invention, the testing framework 600 can use different processing logics for processing the application timestamped event stream and the system timestamped event stream.

For example, the value of the timestamp property for an application timestamped event stream may be considered as an absolute value, while the value of the timestamp property for a system timestamped event stream may be considered as a relative value.

Furthermore, the testing framework 600 can provide special configuration for the timestamp property associated with an application timestamped event stream. For example, the application timestamp can be specified using an attribute or an expression in a test file. Also, the testing framework 600 can employ special processes for performing tests using the system timestamps. For example, the testing framework 600 can calculate a sliding point in the system time, when applying an event window on a system timestamped event stream.

Additionally, the testing framework 600 supports different types of special temporal events, such as a wait event for a system timestamped event stream and a heartbeat event for an application timestamped event stream.

Moreover, the testing framework 600 allows the timestamp to be defined in different units. For example, the timestamp unit in a test XML file can be prescribed in milliseconds, while the timestamp used internally in the event processing system may be in nanoseconds.

In accordance with an embodiment of the invention, the testing framework 600 supports both a time based event window and an event based event window (for both the per-event mode and the batch mode).

A time based event window represents a set of events that are inserted into the event stream during a period of time as specified. For example, a time based event window can be used with a query, SELECT * FROM s1 [RANGE 3 SECONDS], which indicates that the query computes the events from the current time back three (3) seconds. Using such a time based window, when a new event is inserted into the event stream 660, the testing framework 600 can add the new event in the event window 610 and output an insert event. When the event is older than three seconds, the testing framework 600 can delete the event from the event window 610 and output a delete event.

An event based event window represents a set of events, the number of which may be specified. For example, an event based event window can be used with a query, SELECT * FROM s1[ROWS 3], which indicates that the query computes the events from the last event back to the third event in the stream (in the reverse order). Using such an event based window, when a new event is inserted into the event stream 660, the testing framework 600 can add the new event in the event window 610 and outputs an insert event. Also, prior to the insertion, if there are more than three (3) events, the testing framework 600 can delete the oldest event(s) from the event window 610 and output a delete event.

As shown in FIG. 6, the event processing system 620 can generate the output events 650 based on the rules processing (using the timestamp 611-613 values). Also, the testing framework 600 can prescribe one or more expected output events 630 for the input events 601-603.

Then, the testing framework 600 can use the expected output events 621-622 for verifying the actual output events 641-642 that are received from the event processing system 620. The verification process can involve different criterions. For example, the testing framework 600 can ensure that the expected output events 621-622 and actual output events 641-642 are the same kind and have matching timestamps (i.e. the timestamp 631 matches the timestamp 651 and the timestamp 632 matches the timestamp 652) and other properties.

Furthermore, the testing framework 600 can apply a tolerance on the verification process. The tolerance can be used for accommodating the latencies in various tests, since the event processing system 600 may not generate the output event exactly at the expected time, e.g. due to the time consumed by the event processing system 600 for performing the rule execution and event delivery.

Figure 7:
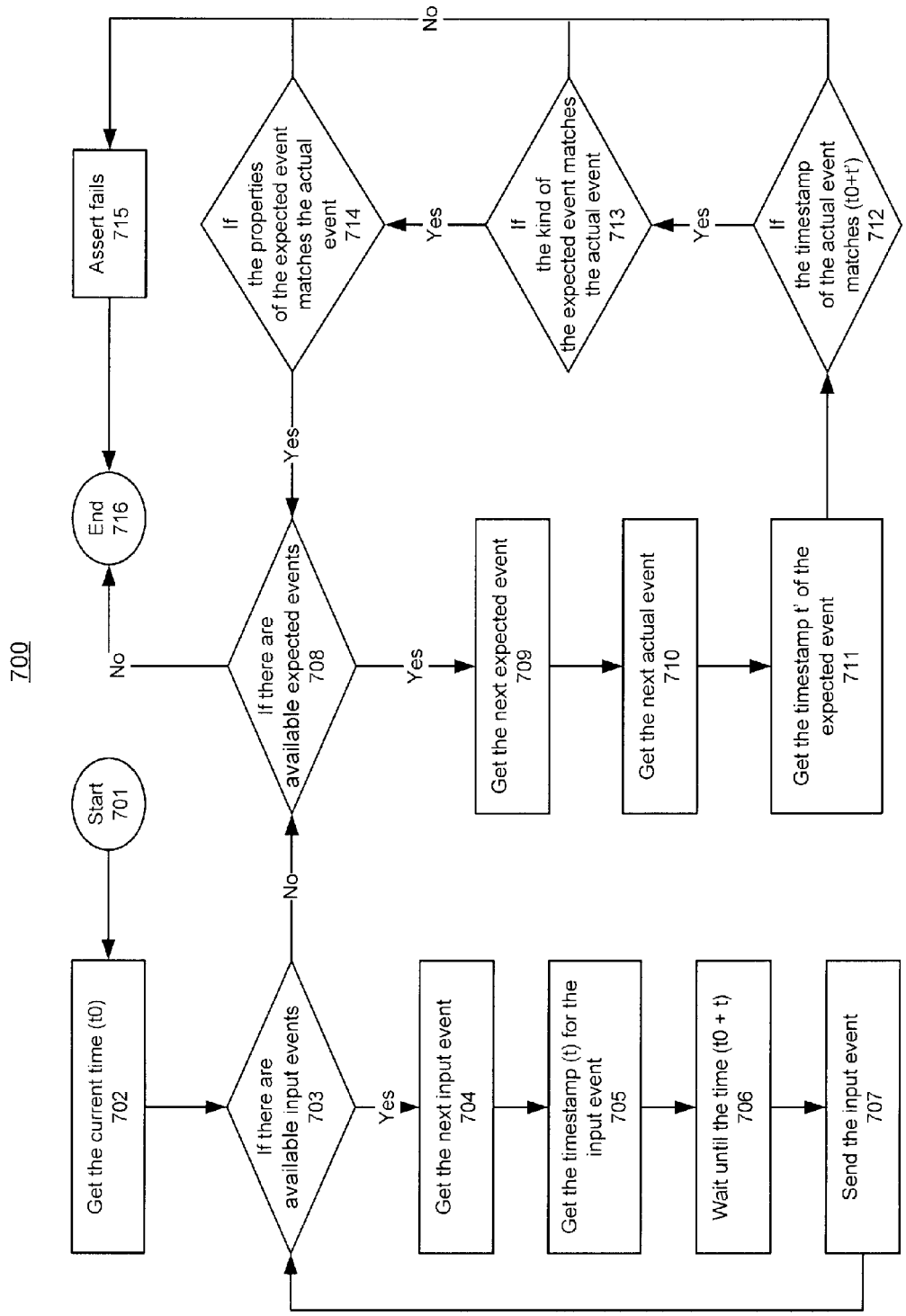
FIG. 7 shows an illustration of verifying the outputs of a query for testing an event processing system, in accordance with an embodiment of the invention.

FIG. 7 shows an illustration of verifying the outputs of a query for testing an event processing system, in accordance with an embodiment of the invention. As shown in FIG. 7, at step 701, the testing framework 700 can start the verification process.

At steps 702-703, the testing framework 700 can obtain the current time (e.g. a system time t0), and checks whether there are available input events.

If there are available input events, at step 704, the testing framework 700 can obtain the next input event. Furthermore, at steps 705-707, the testing framework 700 can obtain the timestamp (t) for the input event, and waits until the time (t0+t). Then, the testing framework 700 can send the input event to the event processing system before going back to the step 703 for checking whether there are more available input events.

On the other hand, if there are no more input events, at step 708, the testing framework 700 can check whether there are available expected (output) events. At step 716, the verification process completes when there are no more expected events.

Otherwise, when there are more expected events, at step 709, the testing framework 700 can obtain the next expected event. Then, at steps 710-711, the testing framework 700 can obtain the next actual event and obtains the timestamp (t') for the expected event.

Moreover, at step 712, the testing framework 700 can check whether the timestamp of the actual event matches the expected time (i.e. t0+t'). At step 713, the testing framework 700 can check whether the kind of the expected event matches the actual event. At step 714, the testing framework 700 can check whether the different properties of the expected event matches the actual event.

At step 715, the testing framework 700 may determine that the verification of the assert statement fails if the checks in one or more of the above steps 712-174 fails. Otherwise, the testing framework 700 can go back to the step 708 checking whether there are more expected events and proceeds accordingly.

Figure 8:
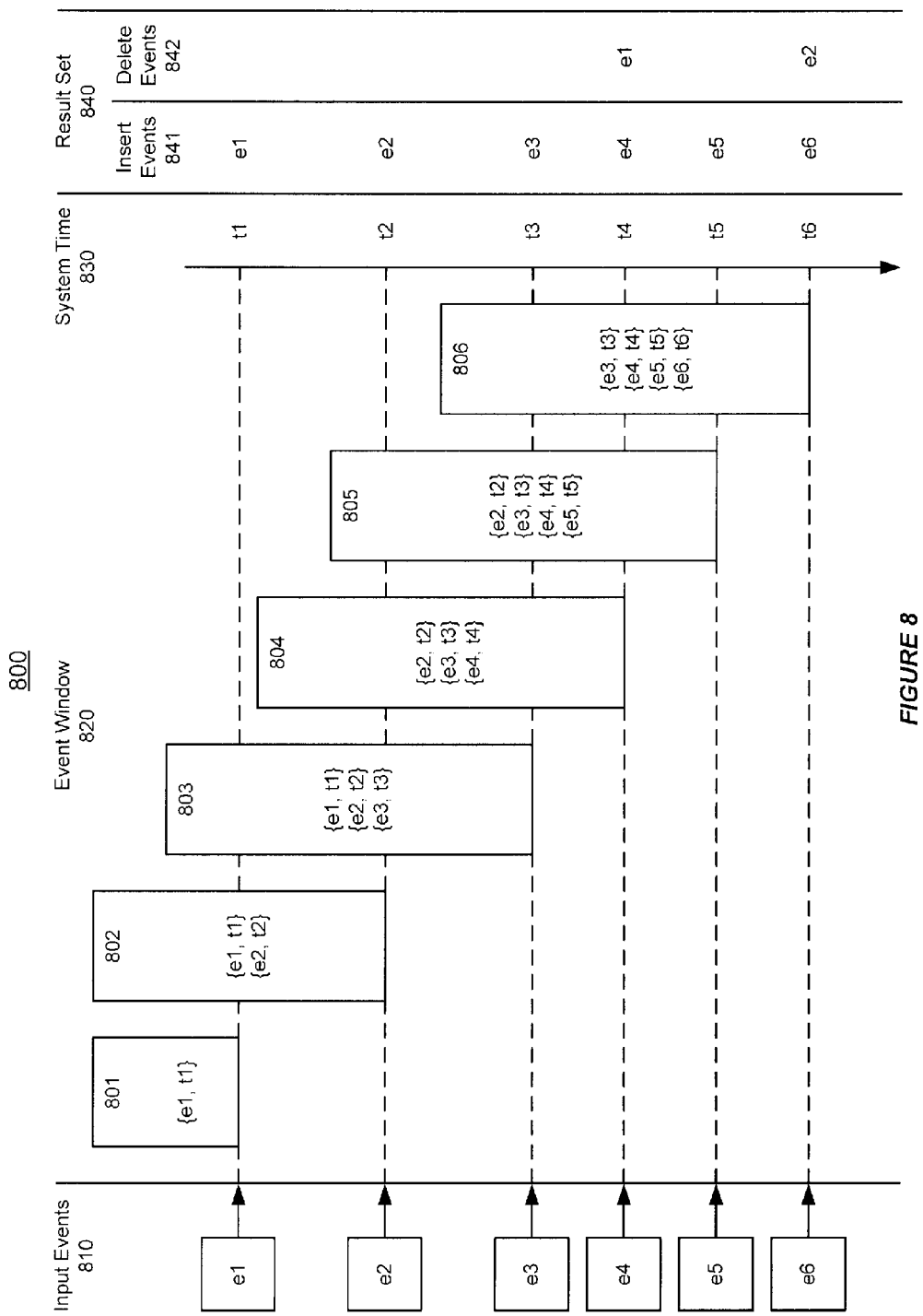
FIG. 8 shows an illustration of testing an event processing system based on a system time, in accordance with an embodiment of the invention.

FIG. 8 shows an illustration of testing an event processing system based on a system time, in accordance with an embodiment of the invention. As shown in FIG. 8, when the test 800 is executed, the testing framework can send one or more input events 810, which are based on a system time 830, to an event processing system. For example, the input events 810 includes the events e1-e6 with the system timestamps t1-t6.

In accordance with an embodiment of the invention, the testing framework 800 can move an event window 820 along with the system time 830. As shown in FIG. 8, the testing framework can move the event window 820 from the window 801 to the window 806 as the events e1-e6 are received by the event processing system.

At the time t1, an event e1 is inserted into the event stream that is received by the event processing system. The system can add the event e1 into the event window 801 since the event e1 is a new event. Also, the result set 840 indicates that the event processing system is expected to output an insert event 841 for the new event e1.

Furthermore, the testing framework can add more new events, such as e2 and e3, in the windows 802-803 respectively, when the new events are inserted into the stream. The result set 840 indicates that the event processing system is expected to output an insert event 841 for each of the new event e2 and e3 separately.

At the time t4, the system can add an event e4, when it is inserted into the event stream. At the same time, the event e1 may be deleted from the window 804, if the event e1 becomes an old event or obsolete (e.g., when the time separation (t4-t1) is longer than the event window 820). Thus, the event processing system is expected to output an insert event 841 for the new event e1 and a delete event 842 for the deleted event e1.

At the time t5, a new event e5 is inserted into the event stream (i.e. in the window 805). The result set 840 indicates that the event processing system is expected to output an insert event 841 for the new event e5.

At the time t6, a new event e6 is inserted into the stream (i.e. the window 806). The result set 840 indicates that the event processing system is expected to output an insert event 841 for the new event e6 and a delete event 842 for the deleted event e2.

The following List 2 is an exemplary XML test file for testing an event processing system using an event window that is based on a system time.

List 2

```
<input-channel id="s1" event-type="StockEvent"/>
<output-channel id="s3" event-type="StockEvent"/>
<rule id="rule1" type="query">
SELECT * FROM   s1[RANGE 3]
</rule>
<input-events channel="s1">
<StockEvent symbol="ABC" price="19.8" createTime="10080900" timestamp="0" kind="+"/>
    <StockEvent symbol="ABC" price="19.9" createTime="10080901" timestamp="1000" kind="+"/>
    <Wait time="2000"/>
</input-events>
<output-events channel="s3" verify="all">
<StockEvent symbol="ABC" price="19.8" createTime="10080900" timestamp="0" kind="+"/>
```

List 2

```
<StockEvent symbol="ABC" price="19.9" createTime="10080901"
  timestamp="1000" kind="+"/>
  <StockEvent symbol="ABC" price="19.8" createTime="10080900"
    timestamp="3000" kind="−"/>
</output-events>
```

As shown in the above List 2, the testing framework includes an event channel s1 for inputting StockEvents and an event channel s3 for outputting StockEvents. Furthermore, the event window, as defined in the rule section, is specified as [RANGE 3 SECONDS], which indicates that the query computes the events from the current time back three (3) seconds.

When the test is executed, a first event, e.g. <StockEvent symbol="ABC" price="19.8" createTime="10080900" timestamp="0"/>, is inserted. The testing framework can use a system time t1 to represent the time when the first event is inserted, since the system time represents only relative time. Thus, the system time t1 can serve as the base time (or a baseline) for the stream of events. For example, the value of the base time t1 may be set as 0, even though the real value of the time is a different number (e.g. 1980911331990) in the system.

Furthermore, the events can be outputted immediately after the query is executed. In the above test, the expected output event at the time t1 can be specified as <StockEvent symbol="ABC" price="19.8" createTime="10080900" timestamp="0" kind="+"/>, which indicates that an insert event is expected to be outputted by the event processing system at the time when the event e1 is inserted.

Additionally, the testing framework receives an actual output event from the event processing system. The testing framework can check whether the value of the pseudo column "time" for the actual event is equal to the sum of the base time, t1, plus the value of the timestamp of the expected event.

For example, the timestamp for the second event, <StockEvent symbol="ABC" price="19.9" createTime="10080901" timestamp="1000"/>, is specified as one thousand (1000) milliseconds. Thus, the second event is expected to be generated by the event processing system one (1) second after the first event.

Additionally, the test file includes a special input, <Wait time="2000"/>, which indicates that the input may be blocked for two (2) seconds. Thus, the end time for the special input is three (3) seconds after the first event (i.e. t1+3000), at which time the system is expected to generate a delete event, <StockEvent symbol="ABC" price="19.8" createTime="10080900" timestamp="3000" kind="−"/>.

Then, the testing framework can compare the actual time of the delete event with the time, at which the first event is inserted (t1), and checks if the difference is three thousand (3000) milliseconds (e.g. with a tolerance applied).

Figure 9:
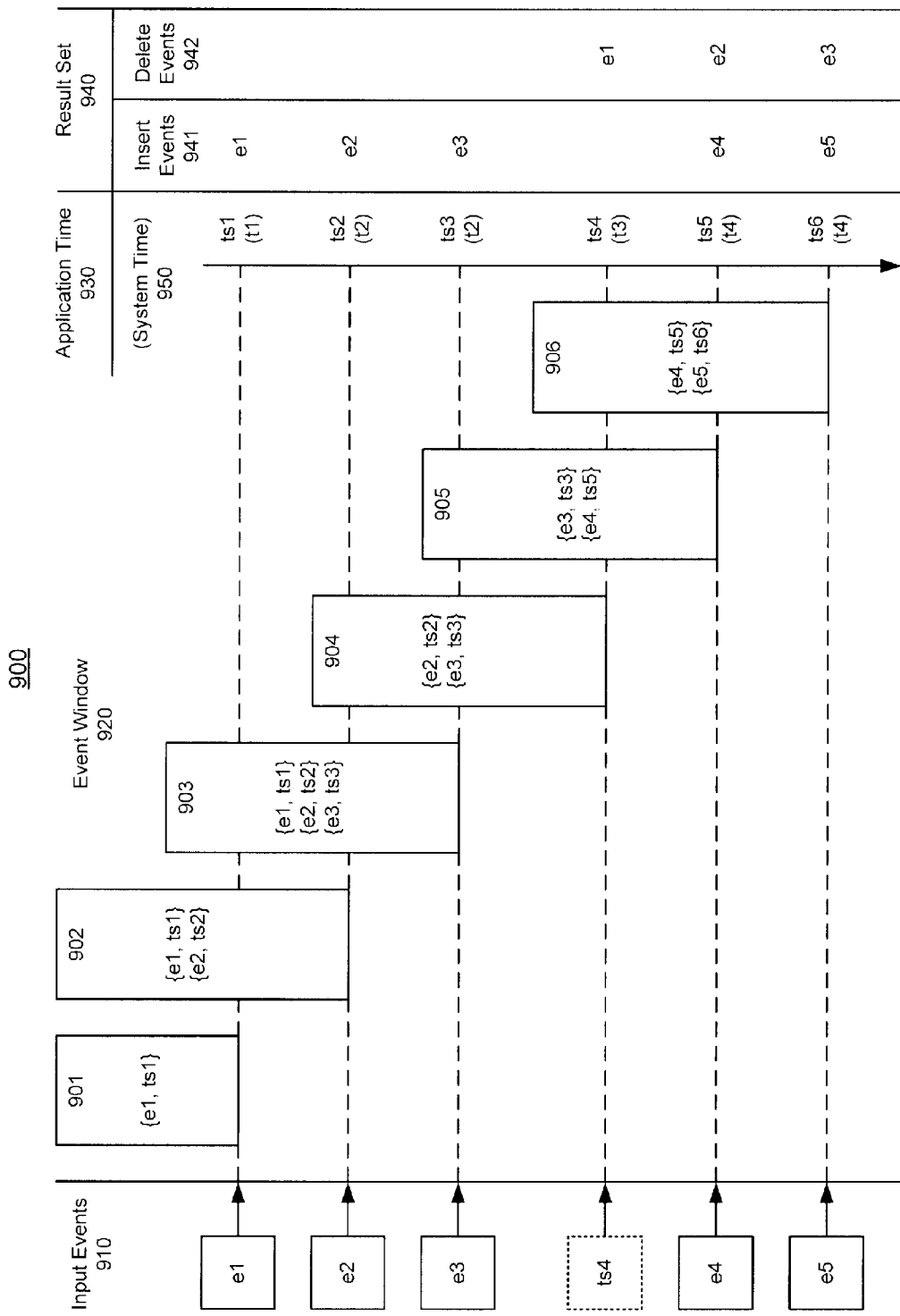
FIG. 9 shows an illustration of testing an event processing system based on an application time, in accordance with an embodiment of the invention.

FIG. 9 shows an illustration of testing an event processing system based on an application time, in accordance with an embodiment of the invention. As shown in FIG. 9, when a test 900 is executed, the testing framework sends one or more input events 910 (e.g. events e1-e5) to an event processing system along the application time 930 (which corresponds to a system time 950).

At the application time ts1 (which corresponds to a system time t1), an event e1 is inserted into the event stream, and ts1 is attached to the event e1 as an application timestamp. Since the event e1 is a new event, the system can add the event e1 into the event window 901. Thus, the event processing system is expected to output an insert event 941 for the new event e1, as indicated in the result set 940.

Furthermore, at the application time ts2 and ts3 (which may both correspond to a system time t1), the new events e2 and e3 can be inserted into the stream (the windows 902-903) respectively. The result set 940 indicates that the event processing system is expected to output an insert event 941 for each of the new event e2 and e3 separately.

As shown in FIG. 9, at the application time of ts4 (which corresponds to a system time t3), a heartbeat event can be inserted into the event stream, which moves the event window 920 to the window 904. Also at this time, the event e1 may become an old event, e.g., when the length of the time separation (ts4-ts1) is greater than the length of the event window 920, and the system may delete the event e1 from the window 904. Thus, the event processing system is expected to output a delete event 942 for the deleted event e1.

Additionally, at the application time ts5 (which corresponds to a system time t4), a new event e4 is inserted into the stream (the window 905). The result set 940 indicates that the event processing system is expected to output an insert event 941 for the new event e4.

At the application time ts6, which may also correspond to a system time t4, a new event e5 is inserted into the stream (the window 906). The result set 940 indicates that the event processing system should output an insert event 941 for the new event e5 and a delete event 942 for the deleted event e2.

The following List 3 is an exemplary XML test file for testing an event processing system using an event window based on an application time.

List 3

```
<input-channel id="s1" event-type="StockEvent">
    <application-timestamped>
        <expression>createTime</expression>
    </application-timestamped>
</input-channel>
<output-channel id="s3" event-type="StockEvent"/>
<rule id="rule1" type="query">
    SELECT * FROM s1[RANGE 3]
</rule>
<input-events channel="s1">
    <StockEvent symbol="ABC" price="19.8" createTime="1000"
      kind="+"/>
    <HeartBeat timestamp="4000"/>
</input-events>
<output-events channel="s3" verify="all">
    <StockEvent symbol="ABC" price="19.8" createTime="1000"
      timestamp="1000" kind="+"/>
    <StockEvent symbol="ABC" price="19.8" createTime="1000"
      timestamp="3000" kind="−"/>
</output-events>
```

As shown in the above List 3, the testing framework includes an event channel s1 for inputting StockEvents and an event channel s3 for outputting StockEvents.

Additionally, the event channel s1 is configured with an application timestamp expression, which indicates that the result of the expression createTime is used as the timestamp of the event (in such a case, the expression result is the value of the attribute createTime of the event).

Furthermore, the event window, as defined in the rule section, is [RANGE 3], which indicates that the query computes the events from the current time back three (3) seconds. Also, the processor is informed that the event window in the query, SELECT * FROM s1[RANGE 3], is subject to the value of the expression createTime.

When the test is executed, an event, <StockEvent symbol="ABC" price="19.8" createTime="1000" kind="+"/>, is inserted into the stream s1. For an application timestamped stream, the time for an input event is either the value of timestamp property of the event or the value of heartbeat. In the rule engine, the associated timestamp of the event is in the application time (e.g. 1000 milliseconds), which is the value of the createTime attribute.

On the other hand, for an output event, the value of the time property is defined in the "time" pseudo column of the actual event and in the timestamp property of the expected event (the value of the createTime attribute is not used as the timestamp, even though the value may be the same with the timestamp).

According to the rule, the expected output event, <StockEvent symbol="ABC" price="19.8" createTime="1000" timestamp="1000" kind="+"/>, is an insert event at the time 1000 milliseconds, which is an absolute value.

When the testing framework receives the actual output event, the testing framework constructs an internal representation, by setting the property "timestamp" to be the value of the pseudo column "time" of the actual event and setting the property "kind" according to the pseudo column "kind" of the actual event.

For verification purpose, the testing framework checks whether the actual output event is an insert event, as indicated by the value "+" for the kind property in the expected output event. Also, the testing framework checks whether the value of the pseudo column "time" of the actual event, is equal exactly to the value of the property "timestamp" of the expected output event.

As shown in the above List 3, a heartbeat, e.g. <HeartBeat timestamp="4000"/>, can be sent to the rule engine, which indicates that the current application time is 4000 milliseconds. Also, the <HeartBeat/> element may be a special event (input) recognizable by the framework, which is not defined in the schema.

In accordance with an embodiment of the invention, using a heartbeat, the time moves a unit by a unit while appearing elapsed normally. Thus, the testing framework expects a delete event, <StockEvent symbol="ABC" price="19.8" createTime="1000" timestamp="3000" kind="-"/>, since the output event is triggered at the time 4000 milliseconds (greater than 3 seconds).

Then, the testing framework checks whether the actual event is a delete event, and checks whether the value of pseudo column "time" is equal to 3000 milliseconds, as indicated by the value of the timestamp property of the expected event.

Figure 10:
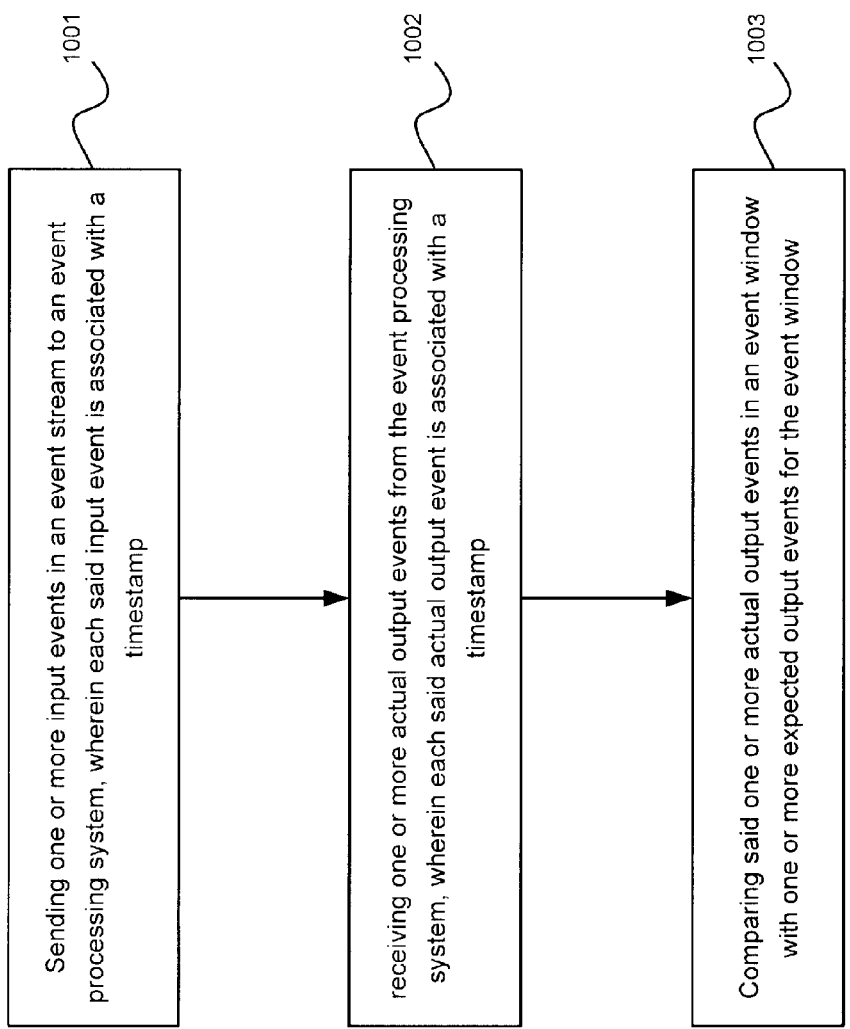
FIG. 10 illustrates an exemplary flow chart for using an event window for testing an event processing system, in accordance with an embodiment of the invention.

FIG. 10 illustrates an exemplary flow chart for using an event window for testing an event processing system, in accordance with an embodiment of the invention. As shown in FIG. 10, at step 1001, a testing framework operates to send one or more input events in an event stream to an event processing system, wherein each said input event is associated with a timestamp. Furthermore, at step 1002, the testing framework can receive one or more actual output events from the event processing system, wherein each said actual output event is associated with a timestamp. Then, at step 1003, the testing framework can compare said one or more actual output events in an event window with one or more expected output events for the event window.

Sliding Window Using an Application Time

Figure 11:
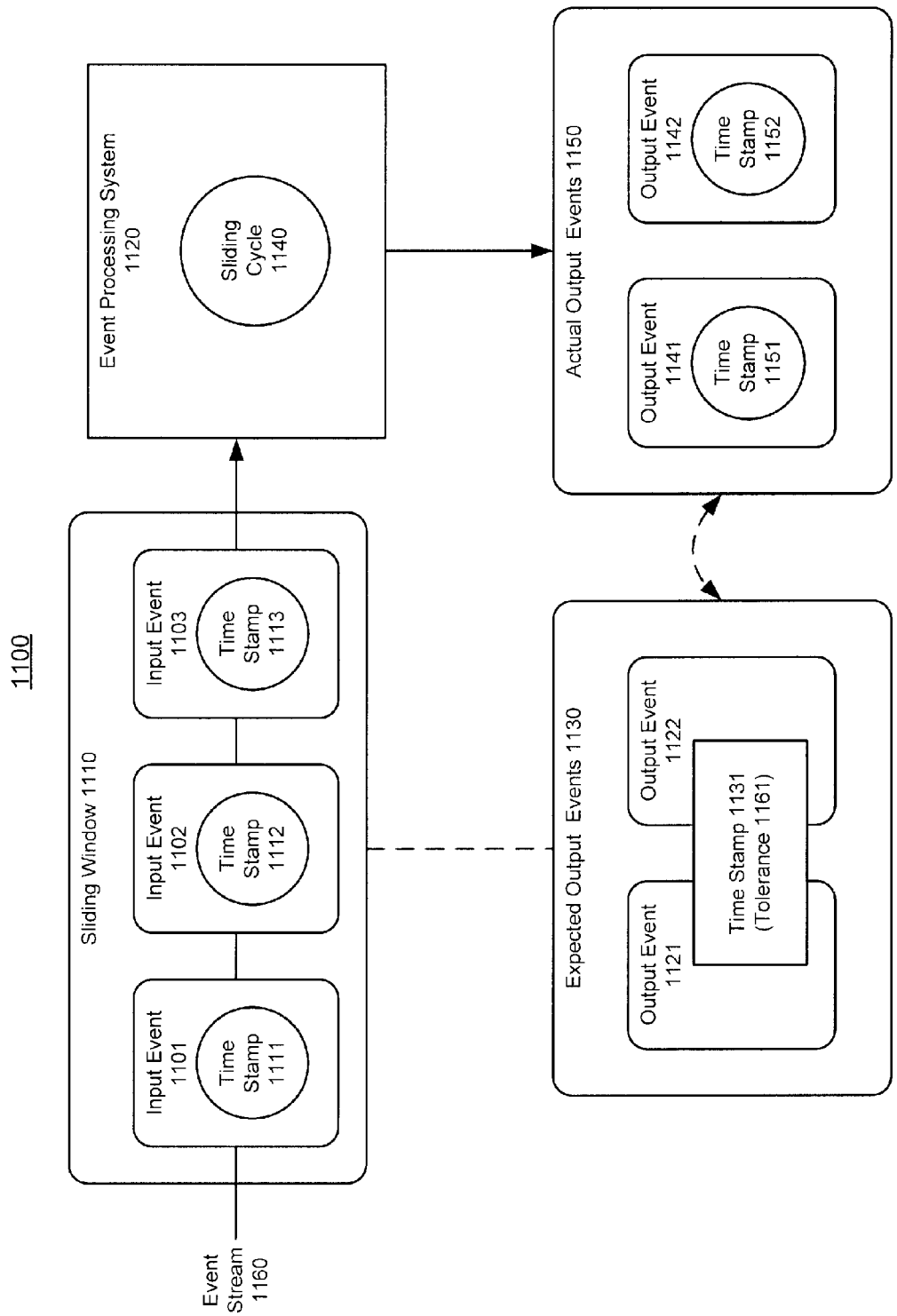
FIG. 11 shows an illustration of supporting a sliding window for testing an event processing system based on an application time, in accordance with an embodiment of the invention.

FIG. 11 shows an illustration of supporting a sliding window for testing an event processing system based on an application time, in accordance with an embodiment of the invention. As shown in FIG. 11, a testing framework 1100 can provide an event stream 1160 to an event processing system 1120, which processes various events in a batch mode. Each of the input events 1101-1103 can be associated with a timestamp, such as the timestamps 1111-1113 that are based on an application time.

In accordance with an embodiment of the invention, the testing framework 1100 can apply an event window, such as a sliding window 1110, on the event stream 1160. The sliding window 1110 can include one or more input events 1101-1103, which are received and processed by the event processing system 1120 within a sliding cycle 1140 (i.e. in a batch).

Furthermore, the testing framework 1100 can receive one or more actual output events 1150, such as the output events 1141-1142, from the event processing system based on the rule processing. Each of the actual output events 1141-1142 can be associated with an application time stamp 1151-1152.

In accordance with an embodiment of the invention, the testing framework 1100 can prescribe one or more expected output events 1130, such as the output events 1121-1122, which share a time stamp 1131. These expected output events 1121-1122 can be used for verifying the actual output events 1141-1142, which are received from the event processing system 1120.

In accordance with an embodiment of the invention, the testing framework 1100 is able to verify the output events, which are generated by the event processing system 1120 in a random order. For example, the testing framework 1100 can verify whether the application timestamps 1151-1152 associated with said actual output events 1141-1142 matches the shared application timestamp 1131 associated with said one or more expected output events 1121-1122 for the sliding window 1110 (e.g. with a tolerance 1161).

As shown in FIG. 11, the output events 1141 and 1142, which are expected to be generated at the same time, may actually be generated at different times (i.e., with different timestamps 1151 and 1152). The order for the output events 1141 and 1142 can be random and may be subject to the exact time that each event is actually generated. Thus, the testing framework 1100 may not be able to compare the actual output events and the expected output events in a sequential order (i.e. one by one).

Figure 12:
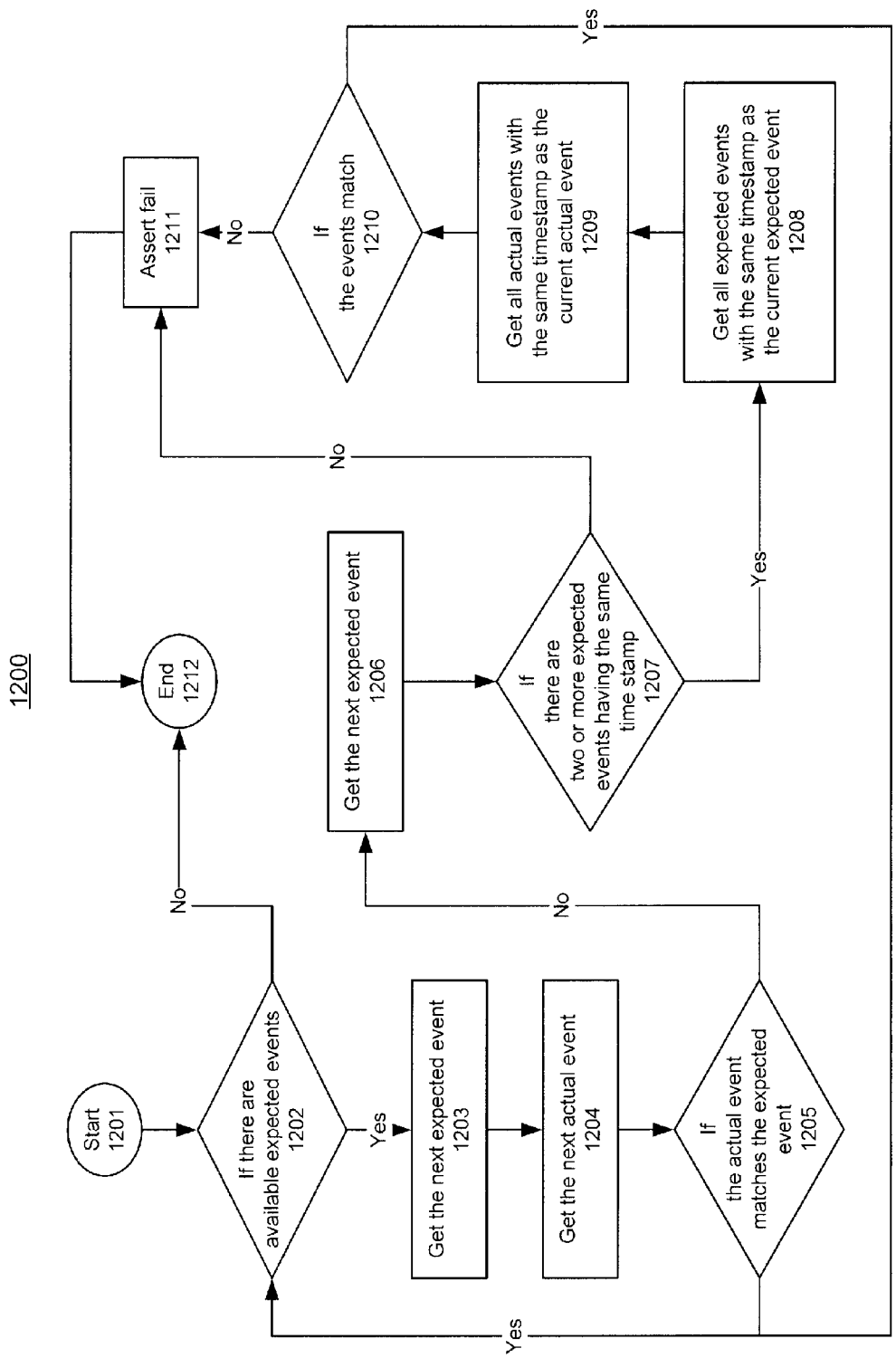
FIG. 12 shows an illustration of verifying the outputs of the query with a system timestamp for testing an event processing system, in accordance with an embodiment of the invention.

FIG. 12 shows an illustration of verifying the outputs of the query with a system timestamp for testing an event processing system, in accordance with an embodiment of the invention. As shown in FIG. 12, at step 1201, the testing framework 1200 can start the verification process.

Then, at step 1202, the testing framework 1200 can check whether there are available expected output events. If there are no expected events, at step 1212, the testing framework 1200 can end the verification process (and confirm that the assert verification is successful).

Otherwise, at steps 1203-1204, the testing framework 1200 can obtain the next expected output event if it is available and obtain the next actual output event.

At step 1205, the testing framework 1200 can check whether the actual output event matches the expected output event. If the actual output event matches the expected output event, the testing framework 1200 can check whether there are more expected output events at step 1202 and then proceeds accordingly.

At steps 1206-1207, if the actual output event does not match the expected output event, the testing framework 1200 can obtain the next expected output event, and check whether there are two or more expected events have the same timestamp. At steps 1211-1212, if there are no expected events that share the same timestamp, the testing framework 1200 may conclude that the assert fails before ending the verification process.

On the other hand, there may be at least two expected events that share the same timestamp. At step 1208, the testing framework 1200 can obtain all expected output events that share the same timestamp. Also, at step 1209, the testing framework 1200 can obtain all actual output events that have the same timestamp as the current actual event.

At step 1210, the testing framework 1200 can check whether the events in the two sets match. If the events in the two sets match, at step 1202, the testing framework 1200 can check whether there are more expected output events. If the events in the two sets do not match, at step 1211, the testing framework 1200 may conclude that the assert fails before ending the verification process.

Figure 13:
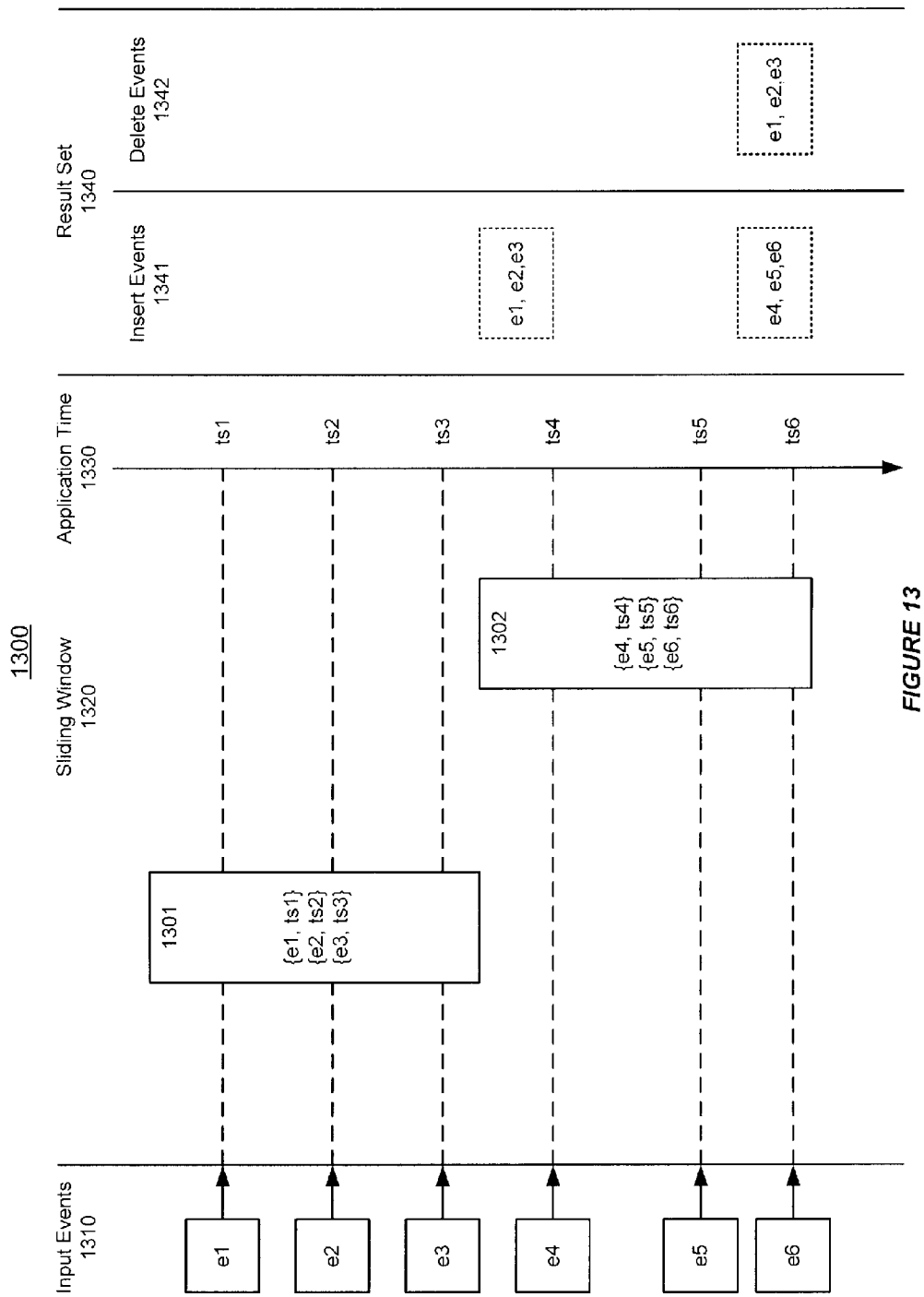
FIG. 13 shows an illustration of testing an event processing system using a sliding window based on an application time, in accordance with an embodiment of the invention.

FIG. 13 shows an illustration of testing an event processing system using a sliding window based on an application time, in accordance with an embodiment of the invention. As shown in FIG. 13, when a test 1300 is executed, the testing framework can insert one or more input events 1310 (e.g. events e1-e6 with application timestamps ts1-ts6) to an event processing system.

The testing framework 1300 can move the sliding window 1320 from the window 1301 to the window 1302 along the application time 1330, as the events e1-e6 are received and processed in a batch mode by an event processing system.

As indicated in the result set 1340, the testing framework 1300 expects the output events to be generated at the end of each sliding window 1301-1302. For example, at the end of the window 1301, the event processing system can generate an insert event 1341 for the events e1-e3. At the end of the window 1302, the event processing system can generate an insert event 1341 for the events e4-e6, and a delete event 1342 for the old events e1-e3.

The following List 4 is an exemplary XML test file for using a sliding window for testing an event processing system based on an application time.

---

List 4

```
<input-channel id="s1" event-type="StockEvent">
<application-timestamped>
    <expression> createTime </expression>
    </application-timestamped>
</input-channel>
<output-channel id="s3" event-type="StockEvent"/>
<rule id="rule1" type="query">
    SELECT * FROM  s1[RANGE 3 SLIDE 3]
</rule>
<input-events channel="s1">
    <StockEvent symbol="ABC" price="19.8" createTime ="0" >
    <StockEvent symbol="ABC" price="19.9" createTime ="1000"/>
    <StockEvent symbol="ABC" price="20.1" createTime ="3001"/>
    <StockEvent symbol="ABC" price="21.2" createTime ="6000"/>
</input-events>
<output-events channel="s3">
    <StockEvent symbol="ABC" price="19.9" createTime="0"
        timestamp="3000" kind="+"/>
    <StockEvent symbol="ABC" price="19.8" createTime="1000"
        timestamp="3000" kind="+"/>
    <StockEvent symbol="ABC" price="20.1" createTime="3001"
        timestamp="6000" kind="+"/>
    <StockEvent symbol="ABC" price="19.8" createTime="0"
        timestamp="6000" kind="-"/>
    <StockEvent symbol="ABC" price="21.2" createTime="6000"
        timestamp="6000" kind="+"/>
    <StockEvent symbol="ABC" price="19.9" createTime="1000"
        timestamp="6000" kind="-"/>
</output-events>
```

---

As shown in the above, the testing framework includes an input channel s1 for inputting StockEvents and an output channel s3 for outputting StockEvents. Additionally, the event channel s1 is configured with an application timestamp expression, which indicates that the result of the expression createTime is the timestamp of the event.

Furthermore, the processor is informed that the event window in the query is subject to the value of createTime. Also, the query, SELECT * FROM s1[RANGE 3 SLIDE 3], which indicates that, for every three (3) seconds, the rule engine computes the events in an event window with a length of three (3) seconds, and the output events are generated every three (3) seconds.

As shown in the above List 4, the sliding window moves, when the event, <StockEvent symbol="ABC" price="20.1" createTime="3001"/>, is inserted. Since the event processing system only generates output events at the end of each sliding windows, the system may generate output for the input events, <StockEvent symbol="ABC" price="19.8" createTime="0"> and <StockEvent symbol="ABC" price="19.9" createTime="1000"/>, at the time of 3000 milliseconds.

The output events of the rule processor are expected to be shown in the following.

---

```
<StockEvent symbol="ABC" price="19.9" createTime="0"
    timestamp="3000" kind="+"/>
<StockEvent symbol="ABC" price="19.8" createTime="1000"
    timestamp="3000" kind="+"/>
```

---

Both the first event and the second event are associated with the timestamp "3000", which indicates that the two events are outputted at the same time. Also, it is possible that the events are received in different orders. In other words, the above result is equivalent to the following.

---

```
<StockEvent symbol="ABC" price="19.8" createTime="1000"
    timestamp="3000" kind="+"/>
<StockEvent symbol="ABC" price="19.9" createTime="0"
    timestamp="3000" kind="+"/>
```

---

Subsequently, the sliding window moves ahead as the event, <StockEvent symbol="ABC" price="21.2" timestamp="6000"/>, is inserted into the event stream. At such a time, two new events are added into the window, two old events are deleted from the window. Thus, the output of the query can be shown as in the following.

---

```
<StockEvent symbol="ABC" price="19.9" createTime="1000"
    timestamp="6000" kind="-"/>
<StockEvent symbol="ABC" price="19.8" createTime="0"
    timestamp="6000" kind="-"/>
<StockEvent symbol="ABC" price="20.1" createTime="3001"
    timestamp="6000" kind="+"/>
<StockEvent symbol="ABC" price="21.2" createTime="6000"
    timestamp="6000" kind="+"/>
```

---

In accordance with an embodiment of the invention, users are allowed to specify the events in different orders in the test file. In the above example, the test is considered successful even when the order of the output events does not match with the order of the expected events, since all the events are outputted at the time 6000 milliseconds.

Figure 14:
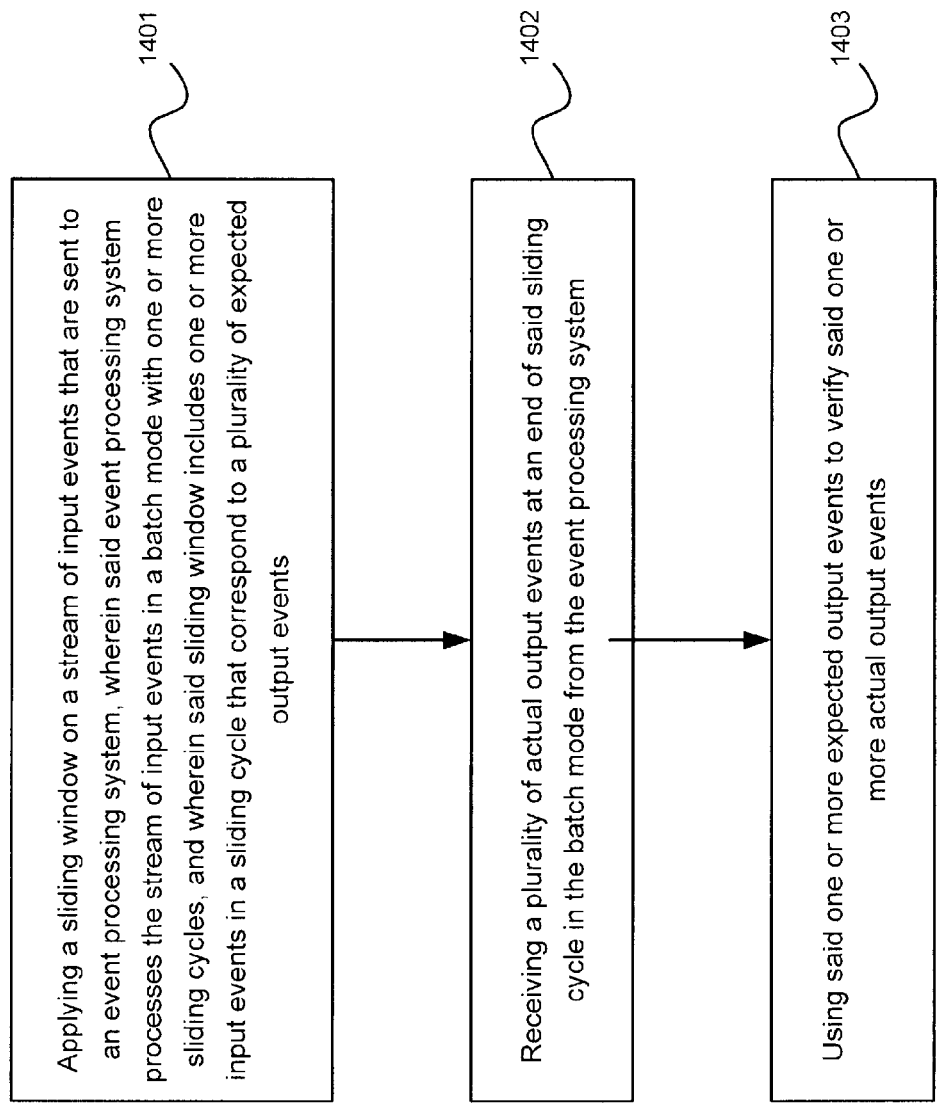
FIG. 14 illustrates an exemplary flow chart for supporting a sliding window for testing an event processing system based on an application time, in accordance with an embodiment of the invention.

FIG. 14 illustrates an exemplary flow chart for supporting a sliding window for testing an event processing system based on an application time, in accordance with an embodiment of the invention. As shown in FIG. 14, at step 1401, a testing framework can apply a sliding window on a stream of input events that are sent to an event processing system, wherein said event processing system processes the stream of input events in a batch mode with one or more sliding cycles, and wherein said sliding window includes one or more input events in a sliding cycle that correspond to a plurality of expected output events. Then, at step 1402, the testing framework operates to receive a plurality of actual output events at an end of said sliding cycle in the batch mode from the event processing system. Furthermore, at step 1403, the testing framework can use said one or more expected output events to verify said one or more actual output events.

Sliding Window Using a System Time

Figure 15:
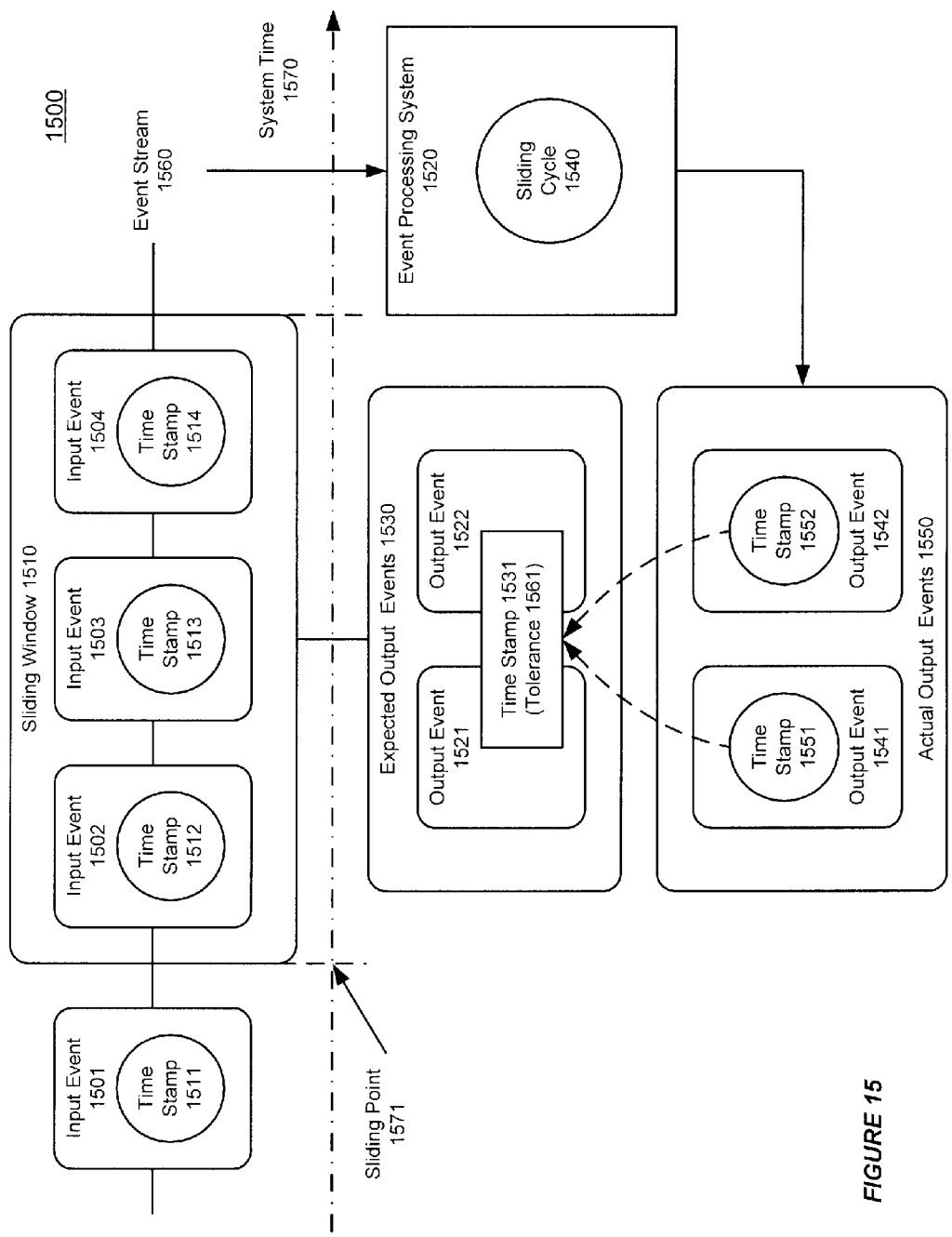
FIG. 15 shows an illustration of supporting a sliding window for testing an event processing system based on a system time, in accordance with an embodiment of the invention.

FIG. 15 shows an illustration of supporting a sliding window for testing an event processing system based on a system time, in accordance with an embodiment of the invention. As shown in FIG. 15, a testing framework 1500 can provide an event stream 1560 to an event processing system 1520 based on a system time 1570. The event stream 1560 includes a plurality of input events 1501-1504.

Furthermore, the event processing system 1520 can process the events 1501-1504 in the event stream 1560 in a batch mode. For example, the event processing system 1520 can process the events 1502-1504, which are in a sliding cycle 1540, in a batch.

As shown in FIG. 15, the input events 1501-1504 can be associated with the timestamps 1511-1514, which are based on a system time 1570. The value of the timestamp (e.g. the pseudo timestamp property) based on the system time 1570 is a relative value, which indicates the time separation between the time when an event is inserted and the initial time when the first event was inserted.

In accordance with an embodiment of the invention, the testing framework 1500 can apply an event window, e.g. a sliding window 1510, on the event stream 1560. The sliding window 1510 may need to match the sliding window 1510 with the sliding cycle 1540, since the value of the timestamp property specified in the system time 1570 may not be used as the real timestamp of the event (unlike an event stream associated with an application timestamp).

For example, the testing framework 1500 can obtain the sliding point 1571 in the system time 1570 for the sliding cycle 1540. The testing framework 1500 can use the sliding point 1571 as a base time for calculating the output events 1530 based on the value of the configured timestamp 1512-1514 of the input events 1502-1504.

As shown in FIG. 15, the sliding window 1510 can include one or more input events 1512-1514, which are received and processed in the sliding cycle 1540 by the event processing system 1520.

Thus, the testing framework 1500 can correctly match the sliding window 1510 in the system time 1570 with the input events 1502-1504 that are processed in a batch mode by the event processing system 1520. Also, the testing framework 1500 can prevent the query associated with the sliding window 1510 from generating the output events 1550 arbitrarily.

In accordance with an embodiment of the invention, the testing framework 1500 can prescribe one or more expected output events 1530, which includes the output events 1521-1522 that share a time stamp 1531.

Furthermore, the expected output events 1521-1522 can be used for verifying the actual output events 1550 that are received from the event processing system 1520. For example, the testing framework 1500 can verify whether the system timestamp 1551-1552, which is associated with each actual output event 1541-1542 received from the event processing system, matches the shared system timestamp 1531 (with tolerance 1561), which is associated with said one or more expected output events 1521-1522 in the sliding window 1510.

Additionally, a tolerance 1561 can be applied to accommodate the latency in the process.

Figure 16:
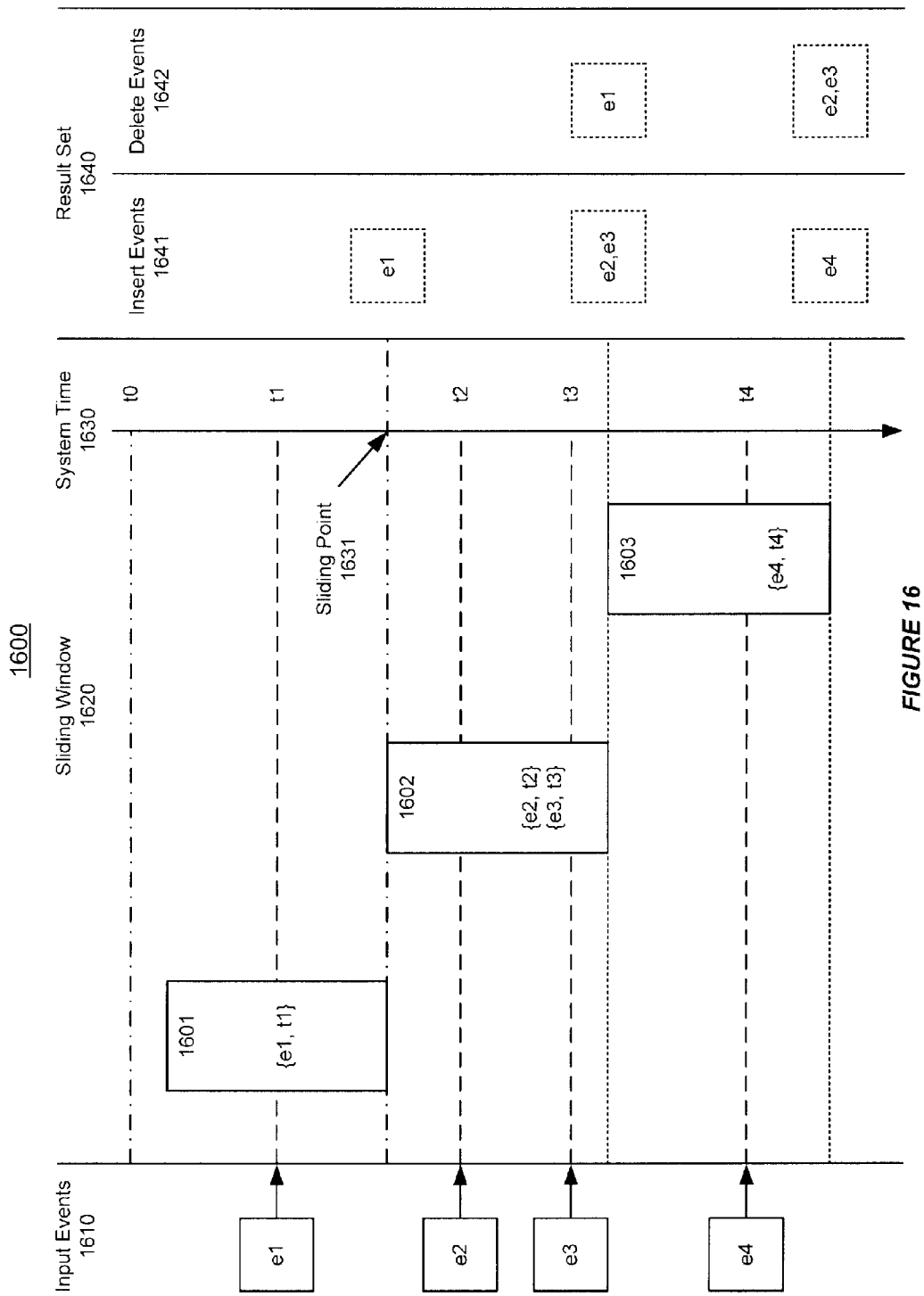
FIG. 16 shows an illustration of testing an event processing system using a sliding window based on a system time, in accordance with an embodiment of the invention.

FIG. 16 shows an illustration of testing an event processing system using a sliding window based on a system time, in accordance with an embodiment of the invention. As shown in FIG. 16, when a testing framework execute the test 1600, the sliding window 1620 moves accordingly to the system time 1630.

For example, the sliding window 1620 may start at an arbitrary system time, t0, from which time the windows 1601-1603 can be calculated (since the query may be started at any time). Furthermore, the testing framework can send one or more input events 1610 (e.g. the events e1-e4 with the system timestamps t1-t4) to the event processing system.

As shown in FIG. 16, at the time t1 (e.g. with a value 0), the first event e1 can be inserted with a system timestamp t1. The separation between the time t1 and the starting time, t0, of the sliding window 1620 can be arbitrary.

Thus, the testing framework may need to correctly determine a base time for the windows 1602-1603. Otherwise, the testing framework 1600 may not be able to ensure that the event windows 1602-1603 match the sliding cycles correctly, since the output events can be random.

As shown in FIG. 16, using a batch mode, the event processing system can generate an output event (an insert event 1641 for the event e1) at the end of the window 1601 (i.e. the sliding point 1631) in the result set 1640. The testing framework 1600 can use the sliding point 1631 as the base time (or baseline) for determining the subsequent sliding windows 1602-1603, which matches the sliding cycles. Thus, the testing framework 1600 is able to determining the output events correctly.

As shown in FIG. 16, an input event, e2, can be inserted into the event stream at the time t2, and an input event, e3, can be inserted into the event stream at the time t3. Thus, at the end of the window 1602, the event processing system may generate an insert event 1641 for the event e2-e3 and a delete event 1642 for the event e1 (since the first event e1 may become obsolete).

Additionally, at the time t4, an input event, e4, can be inserted in to the event stream. Thus, at the end of the window 1603, the event processing system may generate an insert event 1641 for the event e4, and a delete event 1642 for the event e2-e3 (since the events e2-e3 may become obsolete).

The following List 6 is an exemplary XML test file for testing an event processing system using a sliding window based on a system time.

List 6

```
<input-channel id="s1" event-type="StockEvent"/>
<output-channel id="s3" event-type="StockEvent"/>
<rule id="rule1" type="query">
    SELECT * FROM  s1[RANGE 3 SLIDE 3]
</rule>
<assert>
<input-events channel="s1">
<StockEvent symbol="ABC" price="19.8" timestamp="1000" >
    <input-events>
    <output-events channel="s3" verify="any"/>
```

-continued

List 6

```
    </assert>
    <assert>
        <input-events channel="s1">
            <StockEvent symbol="ABC" price="19.9"
                timestamp ="1000"/>
            <StockEvent symbol="ABC" price="20.1"
                timestamp ="2000"/>
            <StockEvent symbol="ABC" price="21.2"
                timestamp ="6000"/>
        </input-events>
        <output-events channel="s3">
            <StockEvent symbol="ABC" price="19.9" timestamp="0"
                kind="-"/>
            <StockEvent symbol="ABC" price="19.8" timestamp="3000"
                kind="+"/>
            <StockEvent symbol="ABC" price="20.1" timestamp="3000"
                kind="+"/>
            <StockEvent symbol="ABC" price="19.8" timestamp="6000"
                kind="-"/>
            <StockEvent symbol="ABC" price="21.2" timestamp="6000"
                kind="+"/>
            <StockEvent symbol="ABC" price="19.9" timestamp="6000"
                kind="-"/>
        </output-events>
    </assert>
```

As shown in the above, the testing framework includes an input channel s1 for inputting StockEvents and an output channel s3 for outputting StockEvents.

Furthermore, the event window defines a query, SELECT * FROM s1[RANGE 3 SLIDE 3], which indicates that the rule engine can periodically compute the events within a range of three (3) seconds (for every three (3) seconds). As a result, the output events can be generated at the end of every three (3) seconds.

The testing framework can take advantage of a configuration, <output-events channel="s3" verify="any"/>, which is defined in the first assert in the above. The value any for the attribute verify indicates that any insert event may satisfy the verify condition.

Thus, the testing framework may generate the first output event at the end of the first sliding window (e.g. t0+9000 milliseconds) for the event <StockEvent symbol="ABC" price="19.8" timestamp="1000">. Then, the testing framework can determine the sliding point accordingly in order to verify the outputs.

Once the processing of the first assert is complete, the testing framework may process the next assert, which starts exactly (or approximately) at the time of the sliding point (i.e. the sliding point is used as a base time). As a result, the input event <StockEvent symbol="ABC" price="19.9" timestamp="1000"/> may be inserted at the time, t0+10000 milliseconds, the event <StockEvent symbol="ABC" price="20.1" timestamp="2000"/> may be inserted at the time, t0+11000 milliseconds, and the event <StockEvent symbol="ABC" price="21.2" timestamp="6000"/> may be inserted at the time, t0+15000 milliseconds.

Also, the testing framework can generate the output events accordingly. For example, the event, <StockEvent symbol="ABC" price="19.9" timestamp="0" kind="-"/>, the event, <StockEvent symbol="ABC" price="19.8" timestamp="3000" kind="+"/>, and the event, <StockEvent symbol="ABC" price="20.1" timestamp="3000" kind="+"/> may be outputted at the time, t0+12000 milliseconds.

Additionally, the event, <StockEvent symbol="ABC" price="19.8" timestamp="6000" kind="-"/>, ="-"/>, the event, <StockEvent symbol="ABC" price="21.2" timestamp="6000" kind="+"/>, and the event, <StockEvent symbol="ABC" price="19.9" timestamp="6000" kind="-"/> may be outputted at the time, t0+15000 milliseconds.

Thus, the testing framework can verify the output of a query, which is based on a sliding window that is applied on the system timestamped stream.

Figure 17:
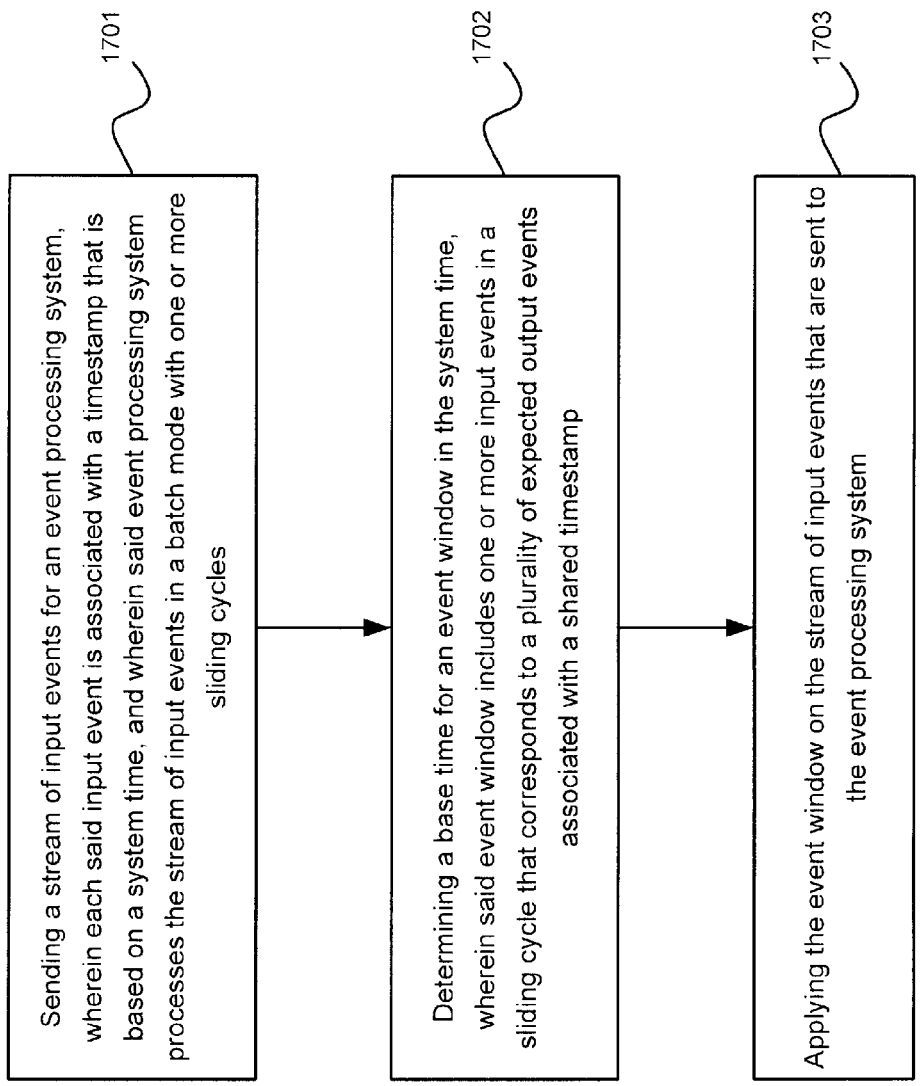
FIG. 17 illustrates an exemplary flow chart for supporting a sliding window for testing an event processing system based on a system time, in accordance with an embodiment of the invention.

FIG. 17 illustrates an exemplary flow chart for supporting a sliding window for testing an event processing system based on a system time, in accordance with an embodiment of the invention. As shown in FIG. 17, at step 1701, a testing framework operates to send a stream of input events for an event processing system, wherein each said input event is associated with a timestamp that is based on a system time, and wherein said event processing system processes the stream of input events in a batch mode with one or more sliding cycles. Furthermore, at step 1702, the testing framework can determine a base time (or a baseline) for an event window in the system time, wherein said event window includes one or more input events in a sliding cycle that corresponds to a plurality of expected output events associated with a shared timestamp. Then, at step 1703, the testing framework can apply the event window on the stream of input events that are sent to the event processing system.

Multiple Input Event Streams

Figure 18:
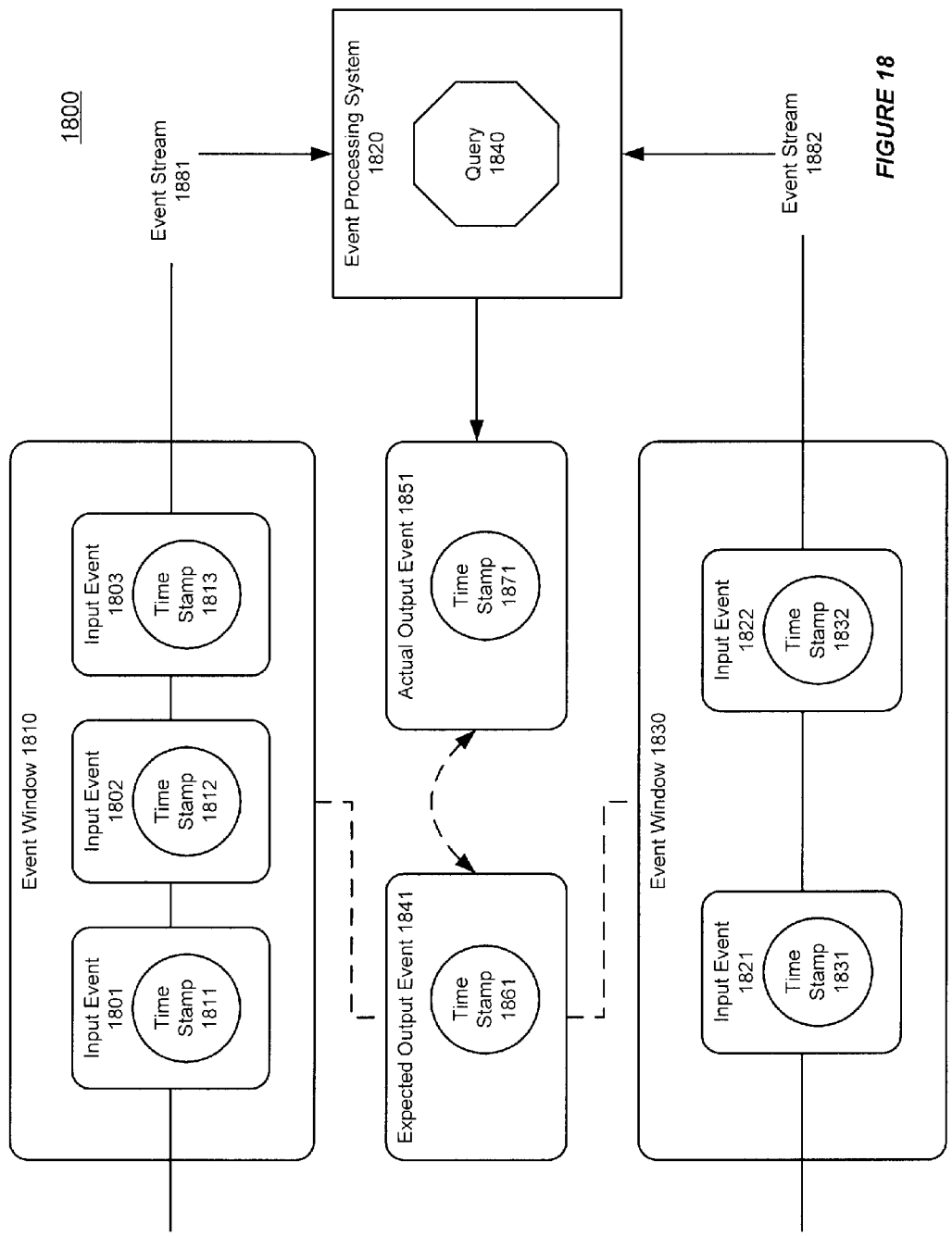
FIG. 18 shows an illustration of supporting testing an event processing system with multiple input event streams, in accordance with an embodiment of the invention.

FIG. 18 shows an illustration of supporting testing an event processing system with multiple input event streams, in accordance with an embodiment of the invention. As shown in FIG. 18, a testing framework 1800 can provide multiple event streams 1881-1882 to an event processing system 1820 in parallel (e.g. using different channels).

In accordance with an embodiment of the invention, the testing framework 1800 can avoid processing the input events sequentially (e.g., in the order that they are presented in the test file). For example, each event stream 1881-1882 can be configured with a separate connection, a separate event channel, and a separate thread. Also, the testing framework 1800 can insert multiple events into the different event streams 1881-1882 at the same time.

Furthermore, the testing framework 1800 can apply separate event windows on different event streams 1881-1882. As shown in FIG. 18, an event window 1810, which includes input events 1801-1803, is applied on the event stream 1881; and an event window 1830, which includes input events 1821-1822, is applied on the event stream 1882.

Additionally, each of the input events can be associated with a timestamp based on either an application time or a system time. For example, the input events 1801-1803 can be associated with a timestamp 1811-1813, and the input events 1821-1822 can be associated with a timestamp 1831-1832.

In accordance with an embodiment of the invention, the events in different streams 1881-1882 (or event channels) can share the same base time (or baseline). The base time for a sliding window in an application timestamped event stream can be the time when the framework starts to process the first assert in the test. On the other hand, the base time for a sliding window in a system timestamped event stream can be the time when the framework starts to process the first assert after obtaining a corresponding sliding point (e.g. the second assert).

Additionally, a query 1840 can be provided to the event processing system 1820 for relating multiple parallel event streams 1881-1882 in event processing. For example, the testing framework 1800 can receive one or more actual output events 1851 from the event processing system 1820 based on the rule processing. Furthermore, the testing framework 1800 can correlate the various input events 1801-1803 and 1821-1822 in different event streams 1881-1882 to generate one or more expected output events 1841.

Then, the testing framework 1800 can verify the actual output events 1851 using the expected output events 1841. For example, the testing framework 1800 can use the expected output events 1841 with a time stamp 1861 to verify the actual output events 1851 with a time stamp 1871.

Figure 19:
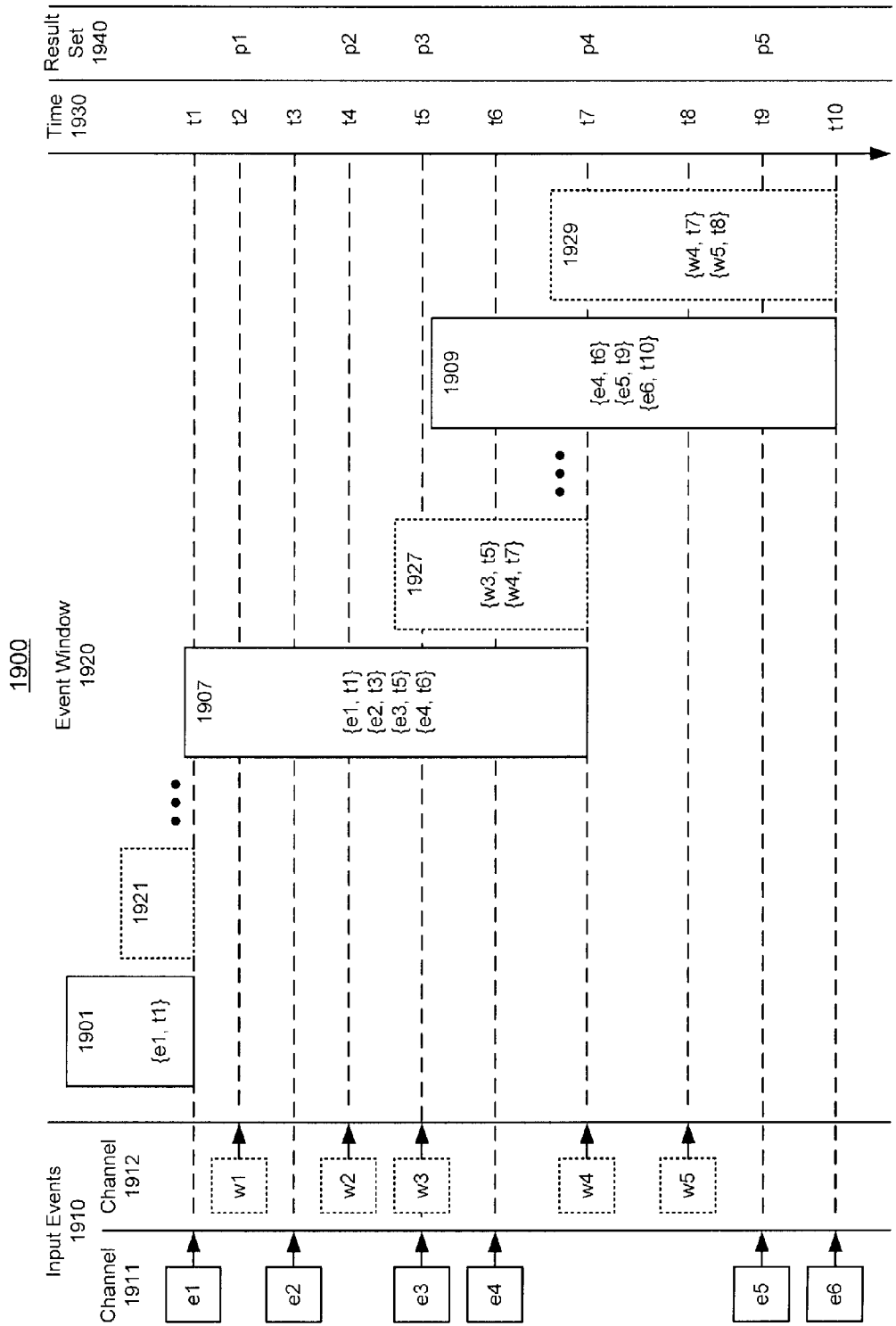
FIG. 19 shows an illustration of using multiple event windows for testing an event processing system, in accordance with an embodiment of the invention.

FIG. 19 shows an illustration of using multiple event windows for testing an event processing system, in accordance with an embodiment of the invention. As shown in FIG. 19, when the test 1900 is executed, the testing framework can send a plurality of input events 1910 in multiple streams to an event processing system as the time 1930 moves from t1 to t10. For example, the events e1-e6 are sent via the channel 1911 and the events w1-w5 are sent via the channel 1912.

Additionally, the event windows 1920 that are applied on the different event channels can be configured differently (i.e., the testing framework can apply different event windows on the event channels separately). For example, the event windows 1901, 1907 and 1909 windows, which are applied on the event channels 1911, can be configured as time based, while the event windows 1921, 1927 and 1929, which are applied on the event channels 1912, can be configured as event based.

As shown in FIG. 19, when the test 1900 is executed, an event e1 is inserted into the event window 1901 via the channel 1911, at the time t1. Then, at the time t2, another event w1 can be inserted via the channel 1912. Based on the rule processing, at the time t2, the event processing system is expected to generate an output event p1 for the inserted events e1 and w1 in the result set 1940.

Furthermore, an event e2 is inserted in the channel 1911 at the time t3 and an event w2 is inserted in the channel 1912 at the time t4. Based on the rule processing, the event processing system is expected to generate an output event p2 for the inserted events e2 and w2, at the time t4.

At the time t5, an event e3 is inserted in the channel 1911 and an event w2 is inserted in the channel 1912. Based on the rule processing, the event processing system is expected to generate an output event p3 for the inserted events e3 and w3, at the time t5.

Additionally, an event e4 is inserted in the channel 1911 at the time t6, and an event w4 is inserted in the channel 1912 at the time t7. Based on the rule processing, the event processing system is expected to generate an output event p4 for the inserted events e2 and w2, at the time t7.

Moreover, an event w5 is inserted in the channel 1912 at the time t8 and the event e5 is inserted in the channel 1912 at the time t9. Based on the rule processing, an output event p5 is expected based on the inserted events e5 and w5. Also, an event e6 is inserted in the channel 1912 at the time t10, at the time t9.

The following List 7 is an exemplary XML test file for testing an event processing system with multiple input event streams.

List 7

```
<input-channel id="s1" event-type="StockEvent"/>
<input-channel id="s2" event-type="OrderEvent"/>
<output-channel id="s3" event-type="TradeEvent"/>
<rule id="rule1" type="query">
SELECT s2.product as product, s1.price as price, s1.createTime as tradeTime FROM s1[RANGE 4],
s2[ROWS 2] WHERE s1.symbol=s2.symbol
</rule>
```

List 7 -continued

```
<input-events channel="s1" parallel="true">
<StockEvent symbol="ABC" price="19.8" createTime="10080900" timestamp="0" />
<StockEvent symbol="AAA" price="19.9" createTime="10080901" timestamp="2000" />
</input-events>
<input-events channel="s2" parallel="true">
<OrderEvent symbol="ABC" product="STOCK" customer="D1" timestamp="1000" />
<OrderEvent symbol="AAA" product="SECURITIES" customer="D2" timestamp="2000" />
</input-events>
<output-events channel="s3" verify="all">
<TradeEvent product="STOCK" price="19.8" tradeTime="10080900" timestamp="1000" kind="+"/>
    <TradeEvent product="SECURITIES" price="19.9"
    tradeTime="10080901" timestamp="2000" kind="+"/>
</output-events>
```

As shown in the above, the testing framework includes an event channel s1 for inputting StockEvents and an event channel s2 for inputting OrderEvents. Additionally, the testing framework includes an event channel s3 for outputting StockEvents.

Furthermore, as defined in the rule section, the event window applied on the input channel, [RANGE 3 SECONDS], indicates that the query computes the events from the current time back three (3) seconds. Also, the event window on the input channel s2, [Rows 2], indicates that the query computes the events for the last two rows.

As shown in the above List 7, the testing framework can include a "parallel" attribute in the <assert/> element. The "parallel" attribute indicates that the testing framework may process the input events in separate threads and all the events in different channels can share the same base time (e.g., the time when the testing framework starts to process the first <assert> statement of the test).

For example, when the testing framework detects that "parallel" attribute for the event channel s1 is set to be "true", the testing framework can proceed to check the "parallel" attributes for the remaining <input-event/> elements. Also, if the value for the "parallel" attribute is "true", the framework can allocate multiple threads and assigns the jobs to process the <input-events/> using different threads. Thus, the testing framework can avoid process the input-events sequentially, such as in the order that are presented in the test file.

When the test is executed, the testing framework can insert a stock event, <StockEvent symbol="ABC" price="19.8" createTime="10080900" timestamp="0"/>, to the channel s1 at time 0, and can insert an order event <OrderEvent symbol="ABC" product="STOCK" customer="D1" timestamp="1000" I> to the channel s2 at time 1000.

Additionally, the testing framework can insert a stock event <StockEvent symbol="AAA" price="19.9" createTime="10080901" timestamp="2000" I> to the channel s1, and insert an order event <OrderEvent symbol="AAA" product="SECURITIES" customer="D2" timestamp="2000" I> to the channel s2, at the same time of 2000.

Thus, the testing framework can use a first thread to process the events in stream s1 with a starting time t1. Therefore, the real time for the first event in stream s1 is t1+0, and the real time for the second event in stream s1 is t1+2000. Also, the testing framework can use a second thread to process the events in stream s2, with the starting time t1. The real time for the first event in stream s2 is t1+1000, and the real time for the second event in stream s2 is t1+2000.

As shown in the above List 7, the user can specify the order for the events. Also, the order of the last two events may be specified different, since the event processing system may not be able to insert the last two events exactly at the same time (i.e. t1+2000).

Figure 20:
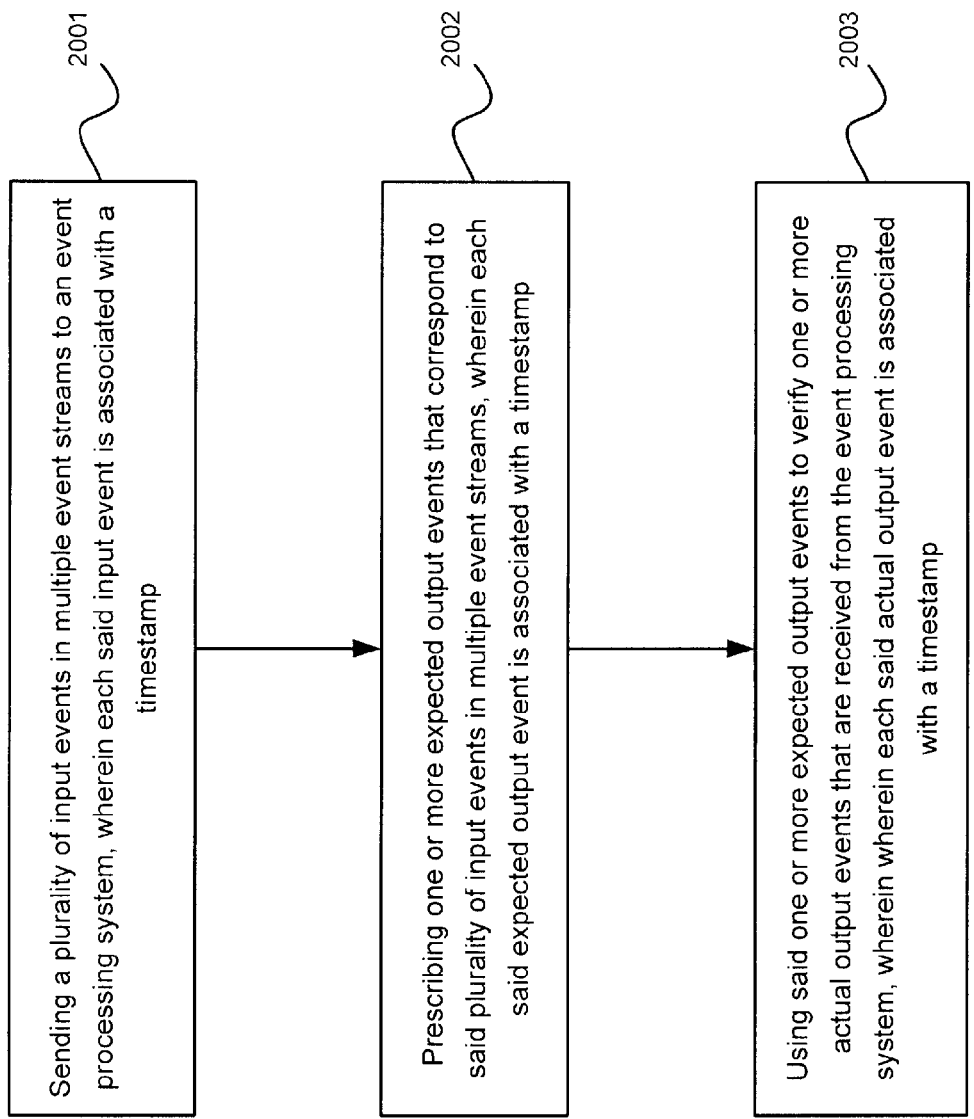
FIG. 20 illustrates an exemplary flow chart for supporting testing an event processing system with multiple input event streams, in accordance with an embodiment of the invention.

FIG. 20 illustrates an exemplary flow chart for supporting testing an event processing system with multiple input event streams, in accordance with an embodiment of the invention. As shown in FIG. 20, at step 2001, a testing framework operates to send a plurality of input events in multiple event streams to an event processing system, wherein each said input event is associated with a timestamp. Furthermore, at step 2002, the testing framework can prescribe one or more expected output events that correspond to said plurality of input events in multiple event streams, wherein each said expected output event is associated with a timestamp. Then, at step 2003, the testing framework can use said one or more expected output events to verify one or more actual output events that are received from the event processing system, wherein each said actual output event is associated with a timestamp.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for testing an event stream processing system with a testing framework, the testing framework operating on one or more processors and operably connected to the event processing system, the method comprising:

declaring input event data, expected output event data, and at least one processing rule for a test in an XML file, wherein the XML file is associated with an XML schema for testing the event processing system;

reading in, by the testing framework, and into a memory accessible by the testing framework, the input event data, output event data, and the processing rule;

sending, by the testing framework, a plurality of input events in multiple event streams to the event stream processing system, wherein each said input event is associated with a timestamp;

prescribing, by the testing framework, one or more expected output events that correspond to said plurality of input events in multiple event streams, wherein each said expected output event is associated with a timestamp; and using, by the testing framework, said one or more expected output events to verify one or more actual output events that are received from the event processing system, wherein each said actual output event is associated with a timestamp.

2. The method of claim 1, further comprising:
converting the input event data into the plurality of input events; and
converting the expected output event data into the one or more expected output events.

3. The method of claim 1, further comprising:
using an attribute in an assert element in the XML file to indicate the multiple event streams.

4. The method of claim 1, further comprising:
configuring said multiple event streams with separate corresponding connections, event channels, and threads.

5. The method of claim 1, further comprising:
applying a plurality of event windows on the multiple event streams, wherein each event stream of the multiple event streams is applied with one event window of the plurality of event windows.

6. The method of claim 5, further comprising:
allowing said plurality of event windows to be in different types.

7. The method of claim 5, further comprising:
allowing said plurality of event windows applied on the multiple event streams to share a common base time.

8. The method of claim 7, further comprising:
using the common base time, when a first assert element of the XML file is processed, as a base time for an application timestamped event stream in a test.

9. The method of claim 7, further comprising:
using the common base time, when a first assert element of the XML file is processed and after a corresponding sliding point is obtained, as a base time for a system timestamped event stream in a test.

10. The method of claim 1, further comprising:
allowing the event stream processing system to use a query to correlate said plurality of input events in multiple event streams to generate said one or more actual output events.

11. A system for testing an event stream processing system, comprising:
one or more microprocessors;
a testing framework, running on the one or more microprocessors and operably connected to the event stream processing system, wherein the testing framework operates to:
declare input event data, expected output event data, and at least one processing rule for a test in an XML file, wherein the XML file is associated with an XML schema for testing the event processing system;

read, into a memory accessible by the testing framework, the input event data, output event data, and the processing rule;

send a plurality of input events in multiple event streams to the event stream processing system, wherein each said input event is associated with a timestamp;

prescribe one or more expected output events that correspond to said plurality of input events in multiple event streams, wherein each said expected output event is associated with a timestamp; and use said one or more expected output events to verify one or more actual output events that are received from the event processing system, wherein each said actual output event is associated with a timestamp.

12. The system according to claim 11, wherein:
the testing framework operates to convert the input event data into the plurality of input events and convert the expected output event data into the one or more expected output events.

13. The system according to claim 11, wherein:
the testing framework operates to use an attribute in an assert element in the XML file to indicate multiple event streams.

14. The system according to claim 11, wherein:
the testing framework operates to configure said multiple event streams with separate corresponding connections, event channels, and threads.

15. The system according to claim 11, wherein:
the testing framework operates to apply a plurality of event windows on the multiple event streams, wherein each event stream of the multiple event streams is applied with a corresponding one event window of the plurality of event windows.

16. The system according to claim 15, wherein:
said plurality of event windows are in different types.

17. The system according to claim 15, wherein:
the testing framework allows said plurality of event windows applied on the multiple event streams to share a common base time.

18. The system according to claim 17, wherein:
the testing framework uses the common base time, when a first assert element of the XML file is processed, as a base time for an application timestamped event stream in a test, and
wherein the testing framework uses the common base time, when the first assert statement is processed and after a corresponding sliding point is obtained, as a base time for a system timestamped event stream in a test.

19. The system according to claim 11, wherein:
the testing framework allows the event processing system to use a query to correlate said plurality of input events in multiple event streams to generate said one or more actual output events.

20. A non-transitory machine readable storage medium having instructions stored thereon that when executed by one or more processors cause a testing framework that is operably connected to an event stream processing system to perform the steps comprising:

declaring input event data, expected output event data data, and at least one processing rule for a test in an XML file, wherein the XML file is associated with an XML schema for testing the event processing system;

reading into a memory accessible by the testing framework, the input event data, output event data, and the processing rule;

sending a plurality of input events in multiple event streams to the event stream processing system, wherein each said input event is associated with a timestamp;

prescribing one or more expected output events that correspond to said plurality of input events in multiple event streams, wherein each said expected output event is associated with a timestamp; and using said one or more expected output events to verify one or more actual output events that are received from the event processing system, wherein each said actual output event is associated with a timestamp.

21. A method for testing an event stream processing system with a testing framework, the testing framework operating on one or more processors and operably connected to the event processing system, the method comprising:

reading in, by the testing framework, and into a memory accessible by the testing framework, input events data, expected output events data, and a processing rule;

converting, by the testing framework, the input events data into a plurality of input event objects;

configuring multiple event streams to the event stream processing system, each of the multiple event streams having separate corresponding connections, event channels, and threads;

sending the plurality of input event objects in the multiple event streams to the event stream processing system, wherein each said input event object is associated with a timestamp;

prescribing one or more expected output events that correspond to said plurality of input event objects in each of the multiple event streams, wherein each said expected output event is associated with a timestamp;

receiving, by the testing framework and from the event stream processing system, an actual output event, wherein the actual output event is associated with a timestamp; and using said one or more expected output events to verify the actual output event.

22. The method of claim 21, further comprising:
applying a plurality of event windows on the multiple event streams, wherein each event stream of the multiple event streams is applied with one event window of the plurality of event windows.

23. The method of claim 22, wherein the plurality of event windows applied on the multiple event streams share a common base time.

24. The method of claim 23, further comprising:
using the common base time, when a first assert statement is processed, as a base time for an application timestamped event stream in a test.

25. The method of claim 23, further comprising:
using the common base time, when a first assert statement is processed and after a corresponding sliding point is obtained, as a base time for a system timestamped event stream in a test.

26. A method for testing an event stream processing system with a testing framework, the testing framework operating on one or more processors and operably connected to the event stream processing system, the method comprising:

reading in, by a testing framework, input events data, output events data, and a processing rule;

converting, by the testing framework, the input events data into a plurality of input event objects;

sending the plurality of input event objects in multiple event streams to the event stream processing system, wherein each said input event object is associated with a timestamp;

applying a plurality of event windows on the multiple event streams, wherein each event stream of the multiple event streams is applied with one event window of the plurality of event windows, and wherein the plurality of event windows applied on the multiple event streams share a common base time;

prescribing one or more expected output events that correspond to said plurality of input event objects in each of the multiple event streams, wherein each said expected output event is associated with a timestamp; and receiving, by the testing framework and from the event stream processing system, an actual output event, wherein the actual output event is associated with a timestamp;

using said one or more expected output events to verify the actual output event ; and using the common base time, when a first assert statement is processed, as a base time for an application timestamped event stream in a test.

27. A method for testing an event stream processing system with a testing framework, the testing framework operating on one or more processors and operably connected to the event stream processing system, the method comprising:

reading in, by a testing framework, input events data, output events data, and a processing rule;

converting, by the testing framework, the input events data into a plurality of input event objects;

sending the plurality of input event objects in multiple event streams to an event processing system, wherein each said input event object is associated with a timestamp;

applying a plurality of event windows on the multiple event streams, wherein each event stream of the multiple event streams is applied with one event window of the plurality of event windows, and wherein the plurality of event windows applied on the multiple event streams share a common base time;

prescribing one or more expected output events that correspond to said plurality of input event objects in each of the multiple event streams, wherein each said expected output event is associated with a timestamp; and receiving, by the testing framework and from the event processing system, an actual output event, wherein the actual output event is associated with a timestamp; and using said one or more expected output events to verify the actual output event; and using the common base time, when a first assert statement is processed and after a corresponding sliding point is obtained, as a base time for a system timestamped event stream in a test.

* * * * *

UNITED STATES PATENT AND TRADEMARK OFFICE
CERTIFICATE OF CORRECTION

PATENT NO. : 10,102,091 B2  
APPLICATION NO. : 14/617556  
DATED : October 16, 2018  
INVENTOR(S) : He et al.

Page 1 of 1

It is certified that error appears in the above-identified patent and that said Letters Patent is hereby corrected as shown below:

In the Drawings

On sheet 20 of 20, in Figure 20, under Reference Numeral 2003, Line 3, delete "wherein wherein" and insert -- wherein --, therefor.

In the Specification

In Column 11, Line 46, after "event" insert -- . --.

In Column 26, Line 54, delete ""1000" I>" and insert -- "1000"/> --, therefor.

In Column 26, Line 58, delete ""2000" I>" and insert -- "2000"/> --, therefor.

In Column 26, Line 61, delete ""2000" I>" and insert -- "2000"/> --, therefor.

In the Claims

In Column 29, Lines 61-62, in Claim 20, delete "data data," and insert -- data, --, therefor.

In Column 31, Line 21, in Claim 26, delete "event ;" and insert -- event; --, therefor.

Signed and Sealed this  
Thirty-first Day of December, 2019

Andrei Iancu  
*Director of the United States Patent and Trademark Office*